(12) United States Patent (10) Patent No.: US 9,363,729 B2
Senarath et al. (45) Date of Patent: Jun. 7, 2016

(54) METHOD AND SYSTEM FOR SOFT HANDOFF IN MOBILE BROADBAND SYSTEMS

(71) Applicant: Apple Inc., Cupertino, CA (US)

(72) Inventors: Nimal Senarath, Nepean (CA); Bill Gage, Stittsville (CA); Shalini Periyalwar, Nepean (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 478 days.

(21) Appl. No.: 13/893,144

(22) Filed: May 13, 2013

(65) Prior Publication Data

US 2013/0250858 A1 Sep. 26, 2013

Related U.S. Application Data

(60) Continuation of application No. 13/158,095, filed on Jun. 10, 2011, now Pat. No. 8,442,009, which is a division of application No. 11/596,603, filed as application No. PCT/CA2005/000862 on Jun. 3, 2005, now Pat. No. 7,979,072.

(60) Provisional application No. 60/577,366, filed on Jun. 4, 2004, provisional application No. 60/581,089, filed on Jun. 18, 2004, provisional application No. 60/586,393, filed on Jul. 8, 2004.

(51) Int. Cl.
*H04W 4/00* (2009.01)
*H04W 36/24* (2009.01)
*H04W 36/18* (2009.01)

(52) U.S. Cl.
CPC .............. *H04W 36/24* (2013.01); *H04W 36/18* (2013.01)

(58) Field of Classification Search
USPC ................................. 370/331, 329, 330, 338
See application file for complete search history.

(56) References Cited

U.S. PATENT DOCUMENTS

| | | | | |
|---|---|---|---|---|
| 2003/0108027 A1* | 6/2003 | Kim | .................. | H04W 36/0094 370/345 |
| 2004/0022177 A1* | 2/2004 | Awad | ................. | H04B 1/70755 370/204 |
| 2004/0233871 A1* | 11/2004 | Seki | ....................... | H04B 7/022 370/331 |
| 2005/0135291 A1* | 6/2005 | Ketchum | ................ | H04L 29/06 370/319 |
| 2007/0064646 A1* | 3/2007 | Esteves | ................. | H04W 28/18 370/329 |

* cited by examiner

*Primary Examiner* — Zewdu A Beyen
(74) *Attorney, Agent, or Firm* — Meyertons, Hood, Kivlin, Kowert & Goetzel, P.C.

(57) ABSTRACT

The present invention provides a method and system for facilitating efficient handoff and data throughput in mobile broadband communication systems. Methods implemented by a system constructed in accordance with the principles of the present invention include selectively enabled soft handoff, performing Layer 2 bearer functions at the base station and using the mobile device to coordinate soft handoff and interference avoidance without the need for a centralized coordination function.

20 Claims, 13 Drawing Sheets

*Macrodiversity Support Function (MSF) can exist in Radio Network Controller and/or Base Station Transceiver System

*Macrodiversity Support Function (MSF) can exist in Radio Network Controller

METHOD AND SYSTEM FOR SOFT HANDOFF IN MOBILE BROADBAND SYSTEMS

This application claims the benefit of priority from and is a continuation of U.S. patent application Ser. No. 13/158,095 (issuing on May 14, 2013 as U.S. Pat. No. 8,442,009), entitled "Method and System for Soft Handoff in Mobile Broadband Systems" and filed Jun. 10, 2011, which claims the benefit of priority from and is a divisional of U.S. patent application Ser. No. 11/596,603 (now U.S. Pat. No. 7,979,072), entitled "Method and System for Soft Handoff in Mobile Broadband Systems" and filed on Oct. 24, 2007, which claims the benefit of priority from and is a U.S. National Stage Patent Application of International Patent Application Number PCT/CA2005/000862, entitled "Method and System for Soft Handoff in Mobile Broadband Systems" and filed on Jun. 3, 2005, which claims the benefit of priority from U.S. Provisional Application No. 60/577,366, entitled "Method and System for Soft Handoff in OFDMA/MIMO based Mobile Broadband Systems with Layer 2 Processing at the Base Station" and filed on Jun. 4, 2004, U.S. Provisional Application No. 60/581,089, entitled "Method and System for Selectively Enabling Soft Handoff based on the Quality of Service Requirements of a Service in Mobile Broadband Systems" and filed on Jun. 18, 2004, and U.S. Provisional Application No. 60/586,393, entitled "System and Method for Mobile Coordinated Multi-Base Resource Reservation for Downlink/Uplink Soft Handoff and Interference Avoidance" and filed on Jul. 8, 2004, all of which are fully incorporated herein by reference for all purposes.

BACKGROUND

1. Field of the Application

The present invention relates to the field of broadband cellular communication systems, and in particular to techniques for facilitating efficient handoff and data throughput, such as using selectively enabled soft handoff, performing Layer 2 bearer functions at the base station and using the mobile device to coordinate soft handoff and interference avoidance without the need for a centralized coordination function.

2. Background of the Disclosure

Soft handoff ("SHO") is a macro-diversity scheme in which the same information is sent to the BTSs via multiple base stations, as opposed to selecting the best station for transmission time to time (as in fast cell selection). Soft handoff may be described generally as transmitting the same information via multiple base stations, as opposed to selecting the best station for transmission from time to time (an example of the latter is fast cell selection). The multiple base stations are selected by the mobile device on the basis of specified signal strength criteria. If selected, a base station becomes a member of the mobile device's active set.

Normally, when a mobile device enters SHO, all active services at the mobile device are supported by SHO. The basis of conventional SHO is the establishment of virtual circuits at the multiple active set base station transceiver systems ("BTSs"). Base station transceiver systems are generally known in the art. Of note, SHO is not defined for the "fatpipe" packet based versions of current systems (e.g., downlinks of 1xEV-DO/DV and Universal Mobile Telecommunications System High Speed Data Packet Access ("HSDPA") systems). 1xEV-DO/DV is a CDMA2000 standard.

Techniques for supporting soft handoff in a general fashion are known. For example, the conventional procedure for triggering soft handoff involves the maintenance of an "active set" of BTSs at each mobile device. A BTS becomes a candidate set member when the pilot signal strength of that BTS exceeds a predetermined value, referred to as a T_ADD value. A BTS is no longer a member of an active set when its pilot signal strength falls below another predetermined value, referred to as T_DROP value, and remains below the T_DROP value for a period defined by the handoff drop timer. (see, for example, Sec. 2.6.6.2.3, TIA-2000.5-D). The mobile resets and disables the handoff drop timer if the strength of the corresponding pilot exceeds T_DROPs. If the timer expires, the BTS is removed from the active set and the mobile device is no longer in SHO with that specific BTS. For adding new BTSs into the active set, the mobile device reports that a Candidate Set pilot is stronger than an Active Set pilot only if the difference between their respective strengths is at least a predetermined value, referred to for example by T_COMP.times.0.5 dB. Thus BTSs are added and removed from the active set on the basis of a set of triggers based on pilot strength.

Once BTSs enter an active set, SHO is initiated. The current trigger for SHO as per the Telecommunication Industries Association CDMA 2000 standard, TIA-2000.5-D, Upper Layer (Layer 3) Signaling Standard for CDMA2000 Spread Spectrum Systems, is as follows:

"When the Active Set contains more than one pilot, the mobile station should provide diversity combining of the associated Forward Traffic Channels" (p-2-586, TIA-2000.5-D).

FIGS. 1 & 2 are derived from TIA-2000.5-D, relating to the eligibility of BTSs to enter or leave active sets are discussed herein to provide a more specific example of inclusion/deletion from an active set. TIA-2000.5-D, in its entirety, is herein incorporated by reference. Referring first to FIG. 1 which shows a typical pilot signal lifecycle for a corresponding BTS, at time (1), the pilot signal strength is greater than T_ADD and the mobile device sends a Pilot Strength Measurement Message and transfers the pilot to the Candidate Set of BTSs. At time (2), the base station sends an Extended Handoff Direction Message, a General Handoff Direction Message or a Universal Handoff Direction message to the mobile device. At time (3), the mobile device transfers the BTS corresponding to the pilot to the Active Set and sends a Handoff Completion message. At time (4), the pilot strength drops below T_DROP and the mobile device starts it handoff drop timer. The handoff drop timer expires at time (5) and the mobile device sends a Pilot Strength Measurement Message to the BTS. At time (6), the base station sends an Extended Handoff Direction Message, a General Handoff Direction Message or a Universal Handoff Direction message to the mobile device. At time (7), the mobile device moves the BTS corresponding to the pilot signal from the Active Set to the Neighbor Set and sends a Handoff Completion Message to the BTS.

FIG. 2 shows typical pilot signal lifecycles for pilot signals P1 and P2 corresponding to multiple BTSs. At time (1), pilot P2 strength exceeds T_ADD and the mobile device transfers the BTS corresponding to the pilot signal to the Candidate Set. At time (2), the pilot signal P2 strength exceeds ((SOFT-_SLOPE/8)*10*log.sub.10 (PS1)+ADDINTERCEPT/2) and the mobile device sends a Pilot Strength Measurement Message to the BTS. At time (3), the base station corresponding to pilot signal P2 sends an Extended Handoff Direction Message, a General Handoff Direction Message or a Universal Handoff Direction message to the mobile device, the mobile device transfers the BTS corresponding to pilot signal P2 to the active set and sends a Handoff Completion Message to the BTS. At time (4) the pilot signal P1 strength drops below ((SOFT_SLOPE/8)*10*log.sub.10 (PS2)+DROP_INTERCEPT/2), and the mobile station starts the handoff drop timer. The handoff drop timer expires at time (5) and the mobile device sends a Pilot Strength Measurement Message to the BTS corresponding to pilot signal P1. At time (6), the BTS corresponding to pilot signal P1 sends a sends an Extended Handoff Direction Message, a General Handoff Direction Message or a Universal Handoff Direction message to the mobile device, the mobile device transfers the BTS corresponding to pilot signal P1 to the Candidate Set and sends a Handoff Completion Message to that BTS. At time (7), the pilot signal P1 strength drops below T_DROP and the mobile device starts the handoff drop timer. The handoff drop times expires at time (8) and the mobile device moves the BTS corresponding to pilot signal P1 from the Candidate Set to the Neighbor Set. Additional details regarding known soft handoff techniques can be found in the CDMA 2000 standard TIA-2000.5-D.

While SHO can be very beneficial to improve a mobile device's carrier-to-interference ratio ("C/I") condition, the network and processing resources demanded through the implementation of SHO are significant. On the downlink (from BTS to mobile device), two or more BTSs are required to transmit the same information to a user which consumes resources in the BTSs and increases the interference seen by all users within the coverage area of those BTSs. On the uplink (mobile device to BTS), while code division multiple access ("CDMA") systems only require additional processing and no specific scheduling of spectral resource, Orthogonal Frequency Division Multiple Access/Multiple Input Multiple Output ("OFDMA/MIMO") systems operating with N=1 reuse will require explicit scheduling of uplink spectrum resources, as is done for the downlink.

In current designs, SHO is triggered on the basis of multiple BTSs in a mobile device's active set. Currently there is no association of SHO trigger with the type of service, e.g., real-time services require a consistent minimum C/I condition to minimize delays in transmission, while "best effort" services do not. This is the case because "best effort" services can afford multiple retransmissions and wait for the mobile device to enter an "up fade". In an "up fade", the C/I is higher than the average within the system, thereby increasing the overall channel capacity. The increased channel capacity provides support for "best effort" services.

Because SHO is demanding on resources, it is best utilized only on an as needed basis. Such an as needed basis is determined by the specific conditions that need to be met to support a given service. It is desirable to have a way to dynamically enter a subset of specific active services in a mobile device into SHO based on the current C/I conditions when the primary BTS is not able to sustain the service if other means to support the service (such as fast cell selection) have been exhausted.

A BTS may modify all handoff related parameters through the Extended Handoff Direction/completion message. There is only one set of parameters available for each mobile device and this set of parameters applies to all the services that the mobile device is actively supporting. There is no known system or method for specifically selecting SHO for certain services or quality of service ("QoS").

It is desirable to have a system and method in which the SHO decision in packet based systems is made on the basis of both current radio link conditions and the requirements of the service(s) or associated data flows that the mobile device is actively supporting at the time of the decision. For example, if a mobile device is simultaneously engaged in a multimedia call with text, voice and video, it may be desirable that the SHO be triggered for the specific data flows of the voice and/or video services only. Additionally, SHO may be triggered only when other features, such as power stepping, adaptive modulation, fast cell selection macro-diversity, are inadequate to maintain the service quality.

In addition, while SHO can be very beneficial to improve a mobile C/I condition, there is a need for some form of centralized control to enable simultaneous transmissions from multiple BTSs using the same resource, i.e., radio channel, frequency and code. This requires co-ordination of the resources among participating BTSs. Typically, the coordination is done in a centralized manner using a network entity such as the radio network controller ("RNC"), which co-ordinates the functions of the BTSs.

There is no existing system or method for enabling base station transceiver resource co-ordination without the aid of a centralized network entity such as a RNC. Multi-base station resource co-ordination is usually done by a central entity such as a RNC. As such some Layer 2 resource functions, such as scheduling reservations for SHO, need to be made at a central common entity in the network.

The wireless communication industry is moving toward distributed architectures where the wireless network edge nodes do not require central control functions and are able to cover the intended coverage areas adequately and uniformly. However, because interference among neighboring sectors is very high (especially in reuse one systems), methods of interference avoidance or coordinated transmission techniques such as SHO are required to provide adequate coverage. Such techniques require centralized base station transceiver resource co-ordination and, therefore, cannot be implemented under a distribute architectures. One of the major challenges faced by the industry in moving toward distributed architecture is to improve coverage without using such centralized control functions.

There have been proposals which suggest moving all radio Layer 2 media access control/radio link protocol ("MAC/RLP") functions to the BTS instead of carrying them out at a central entity. However, even in those proposals, simultaneous resource allocations needed in multiple base stations are still required to be carried out by a central entity. As such, these proposals still require a relatively complex access architecture, i.e., the protocols that are used to co-ordinate multiple BTS transmissions. In summary, with known SHO implementations or proposals, disadvantageously (1) either the RNC does all the scheduling, (2) the BTSs must send periodic updates to the RNC, or (3) slots must be reserved/tentatively reserved a priori by the RNC for SHO use. It is therefore desirable to simplify the access network architecture by allowing resource reservation by the mobile devices engaged in SHO instead of conducting such resource reservation via a central entity such as an RNC.

In some cellular networks such as those which support packet data traffic, there is no central entity to perform such coordination. This results in a cellular network design which therefore precludes the use of soft handoff or any other similar scheme requiring multi-base resource coordination to improve coverage. It is therefore desirable to have a system and method to provide a means to enable such flat networks to support soft handoff with the assistance of the mobile device with respect to the co-ordination of resources at multiple BTSs.

A detrimental characteristic of broadband cellular communication systems is that they suffer from uneven coverage. To improve coverage performance, cellular communication systems may employ macro-diversity such as the above-described soft handoff. The processing of soft handoff information may happen based on internet protocol ("IP") packet selection diversity, radio link protocol ("RLP") packet data unit ("PDU") selection combining (1×EV-DV reverse link), or physical layer combining (1×RTT forward link and reverse link). 1×EV-DV and 1×RTT are CDMA 2000 standards. Soft handoff is naturally controlled by a central entity such as the RNC.

Current downlink (from base station to mobile device) soft handoff techniques used in power controlled CDMA systems e.g., 1×RTT, involve the multicasting of RLP PDUs from the RNC to BTSs, followed by simultaneous transmissions from multiple BTSs. The scheme is designed primarily for CDMA systems which are based on the RLP at the centralized RNC. It should be noted that soft handoff is a requisite feature for CDMA systems to address the resultant interference arising from the neighboring cell (using the principle of converting the interference to a wanted signal) and the near-far problem. The near-far problem is well known by those of ordinary skill in the art and is not explained herein.

Current uplink soft handoff techniques (from mobile device to base station), e.g., 1×EV-DO, include the simultaneous reception of information sent by a mobile device by multiple BTSs and forwarding of the RLP frames to the RNC where combining in the form of soft combining or selection combining occurs. For CDMA systems there is no requirement for explicit scheduling of resources on the uplink because the mobile device's unique pseudorandom noise ("PN") code can be detected by any BTS. However, a receiver needs to be dedicated at each of the BTSs in the active set to demodulate the mobile device's transmissions.

Future networks may likely be based on a more distributed architecture, where the Layer 2 processing media access control/radio link protocol ("MAC/RLP") is done exclusively at the BTS (e.g., Flarion). Furthermore, these networks may be operated with an OFDMA/MIMO air interface. The subject invention provides a solution to support soft handoff for OFDMA/MIMO rate controlled systems in which the Layer 2 (MAC/RLP) functions, i.e., segmentation/concatenation of packets, reassembly of packets, retransmission, reside exclusively at the BT. Advantageously, the present invention addresses both downlink ("DL") and uplink ("UL") soft handoff.

It is desirable to have a system which addresses the coordination of transmissions from/to different BTSs to/from the mobile device, so that multiple BTSs transmit/receive the same data to/from a given mobile device to obtain macro-diversity gain in a manner which does not require coordinated Layer 2 processing at a central location such as RNC. This design criterion impacts several aspects of the design such as the segmentation of data packets, the buffering of data packets, the resource reservation for given service, the simultaneous scheduling of a mobile device's packet in all the BTSs in the active set (this is applicable to both DL and UL transmissions), and the hybrid automatic repeat request ("HARQ") or Layer 2 retransmissions for services in soft handoff.

Current DL soft handoff solutions for CDMA apply only to power controlled systems. However, there is a need to provide soft handoff solutions for other types of systems. There is also a need for centralized RLP processing and buffer management. However, current UL soft handoff solutions rely on a central entity such as a RNC to provide the coordination by forming the RLP packets such that sequence numbers for these packets are maintained at the centralized location. All negative acknowledgements ("NAKs") or acknowledgements ("ACKs") for the transmissions then terminate at the RNC. This method introduces undesirable complexity in the network architecture, and cannot be implemented in a distributed Layer 2 architecture.

There is currently no solution to enable soft handoff in a distributed architecture where the RLP processing is done at the BTS. It would be desirable to have a system and method which provides soft handoff in a distributed architecture in which the RLP processing is done at the BTS.

SUMMARY

The present invention advantageously provides a method and system for the present invention provides methods and systems to facilitate the usability of broadband cellular communication systems. In particular the present invention addresses deficiencies in the art by providing techniques for facilitating efficient handoff and data throughput, such as using selectively enabled soft handoff, performing Layer 2 bearer functions at the base station and using the mobile device to coordinate soft handoff and interference avoidance without the need for a centralized coordination function.

In accordance with one aspect, the present invention provides a soft handoff processing method for communication in a mobile broadband system supporting a service in which a determination is made as to whether the service is eligible for soft handoff. Soft handoff is activated if the service is eligible for soft handoff.

In accordance with another aspect, the present invention provides a mobile broadband system supporting soft handoff for a service in which there are a plurality of base station transceiver systems. A mobile device is arranged to engage in wireless communications with the plurality of base station transceiver systems. A controller is in operative communication with the plurality of base station transceiver systems and the mobile device. The controller determines whether the service is eligible for soft handoff and activates soft handoff if the service is eligible for soft handoff.

In accordance with yet another aspect, the present invention provides a method for communication in a mobile broadband system in which a mobile device coordinates communication with a plurality of base station transceiver systems by reserving communication resources from the plurality of base station transceiver systems in which a resource request is transmitted to at least one of the plurality of base station transceiver systems. Resource availability data is received from the at least one of the plurality of base station transceiver systems. A common set of available resources for transmission is selected based on the received resource availability data.

In accordance with still another aspect, the present invention provides a mobile broadband system for reserving communication resources in which there are a plurality of base station transceiver systems. A mobile device is arranged to engage in wireless communications with the plurality of base station transceiver systems. The mobile device transmits a resource request to at least one of the plurality of base station transceiver systems, receives resource availability data from the at least one of the plurality of base station transceiver systems and selects a common set of available resources for transmission based on the received resource availability data.

In accordance with still yet another aspect, the present invention provides a processing method for communication from a mobile device in a first network to a destination device in a second network using soft handoff in a mobile broadband system in which an active set of base station transceiver systems is determined. Resource reservation at the macrodiversity support function is determined for the base station transceiver systems in the active set of base station transceiver systems for communication of a high level data communication packet. Radio link protocol packets comprising the full high level data communication packet are transmitted to the base station transceivers in the active set based on the determined resource reservations. The full high level data communication packet is forwarded to a macrodiversity support function. These steps are repeated for all high level data communication packets to be transmitted.

In accordance with still yet another aspect, the present invention provides a data packet processing method for communication to a mobile device in a first network from a destination device in a second network using soft handoff in a mobile broadband system, in which an active set of base station transceiver systems is determined. Each of the data packets to be transmitted to the mobile device is segmented into radio link protocol packets based on a predetermined segmentation algorithm. A synchronized transmission resource reservation for the radio link protocol packets is determined and the resource reservation is provided to all base station transceiver systems in the active set. The data packet is transmitted to each of the base station transceiver systems in the active set. Each of the radio link protocol packets is transmitted to the mobile device based on the transmission schedule using soft handoff.

In accordance with another aspect, the present invention provides a mobile broadband system using soft handoff in which there are a plurality of base station transceiver systems. A macrodiversity support function is in data communication with the plurality of base station transceiver systems. The macrodiversity support function determines resource reservation for the base station transceiver systems in the active set of base station transceiver systems for communication of a high level data communication packet. A mobile device is arranged to engage in wireless communications with plurality of base station transceiver systems. The mobile device determines an active set of base station transceiver systems and transmits radio link protocol packets comprising the full high level data communication packet to the base station transceivers in the active set based on the determined resource reservations. The base station transceiver systems forward the full high level data communication packet to the macrodiversity support function.

In accordance with an aspect, the present invention provides a mobile broadband system using soft handoff to facilitate transmission of a plurality of data packets in which there are a plurality of base station transceiver systems. A mobile device is arranged to engage in wireless communications with plurality of base station transceiver systems. The mobile device determines an active set of base station transceiver systems. A macrodiversity support function is in data communication with the plurality of base station transceiver systems. The macrodiversity support function determines a synchronized transmission resource reservation for radio link protocol packets including the data packet and provides the resource reservation to all base station transceiver systems in the active set. The data packet is transmitted to each of the base station transceiver systems in the active set. The base station transceiver systems in the active set segment the data packet into the radio link protocol packets based on a predetermined segmentation algorithm and transmit each of the radio link protocol packets to the mobile device based on the transmission schedule using soft handoff.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 3:
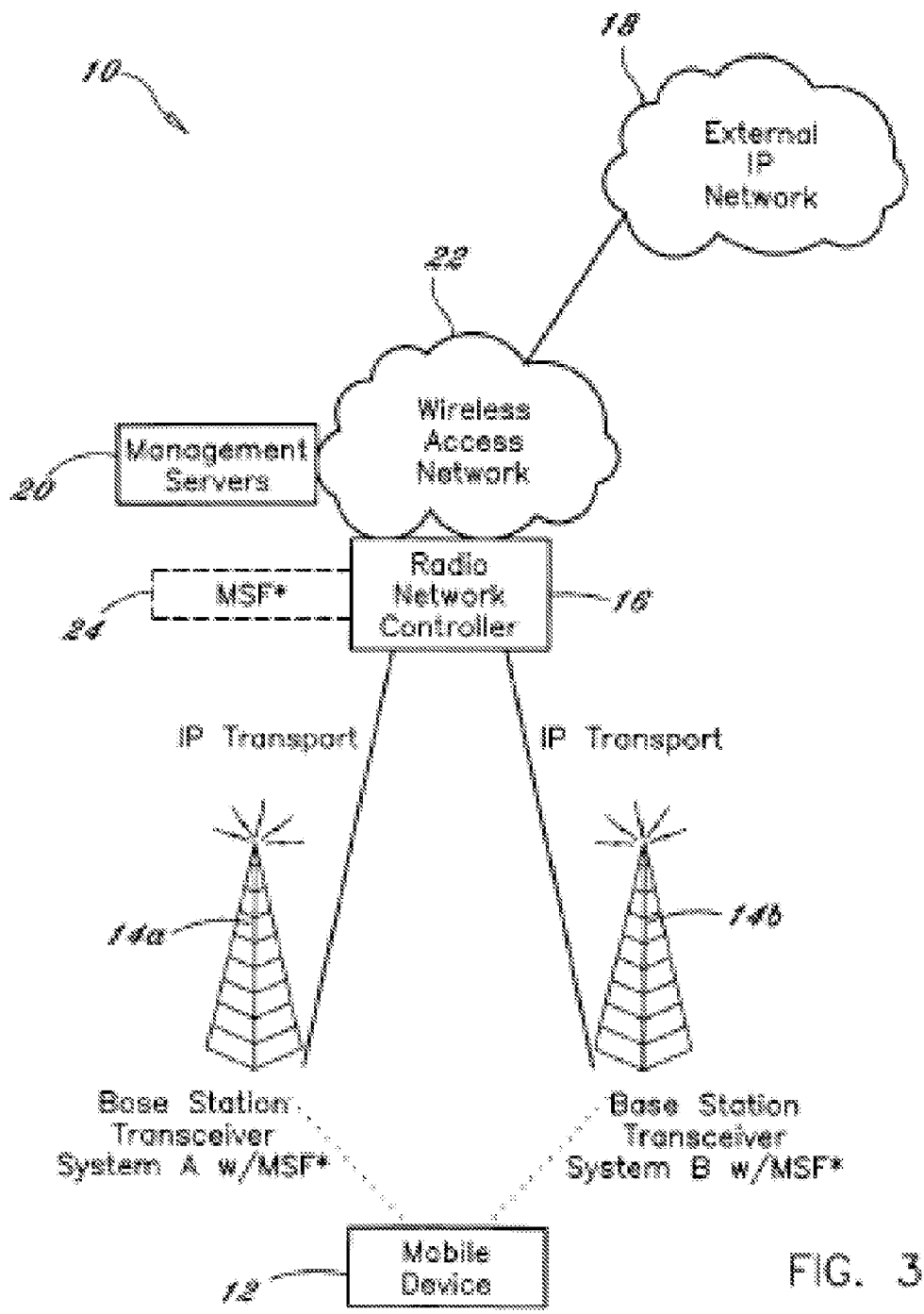
FIG. 3 is a diagram of an exemplary system constructed in accordance with the principles of the present invention.

Referring now to the drawing figures in which like reference designators refer to like elements, there is shown in FIG. 3 a diagram of an exemplary system constructed in accordance with the principles of the present invention, and designated generally as 10. System 10 includes a mobile device 12 arranged to wirelessly communicate with one or more BTSs 14a and 14b (BTSs 14 are generally referred to herein as BTSs 14) in which the BTSs 14 and the mobile device 12 support soft handoff. The mobile device 12 supports a high level communication protocol such as the Internet Protocol ("IP"). The BTSs 14 in turn, communicate with a Radio Controller 16, i.e., Radio Network controller ("RNC"), Base Station Controller ("BSC") or a server with similar functional support, e.g. mobility, macro-diversity, security via an internal communication network. As used herein, the RNC 16 represents this controller. The RNC 16 provides high level protocol support with external communication networks 18, such as the Internet, and also interacts with management servers 20 in the core wireless access network 22 to manage the flow of high level protocol packets between the mobile device and the external network 18, such as the Internet. It should be understood that the term macro-diversity support functions ("MSF") 24 as used herein represents the macrodiversity support functionalities typically residing in the RNC/BSC 16 and/or BTSs 14 or the functions described herein with respect to the present invention. In addition, MSF functionality can be provided by servers in wireless access network 22 and/or external IP network 18.

Mobile device 12 can be any device arranged to engage in wireless communication with a base station such as BTS 14 such as a laptop personal computer, personal digital assistant (PDA), cellular telephone, and the like. Mobile device 12 includes a central processing unit, volatile and non-volatile storage devices, wireless transmitter/receiver and other input/output devices operable to perform the functions described herein. Similarly, BTSs 14, RNC 16 and management servers 20 include hardware and software as is known in the art, modified to perform the functions of the present invention as described herein.

Once a system 10 is deployed, the coverage a system 10 can provide to its customers for different services, e.g., voice, data, multimedia, etc., within the system can be estimated based on various propagation measurements and system parameters. When a BTS 14 cannot provide adequate coverage for certain services, the coverage can be extended using multiple BTSs 14 and SHO techniques so that these services will then become viable service offerings of the system. The present invention advantageously provides a system and method in which SHO is enabled in a dynamic manner based on the service/application or specific data flows of a user wants to obtain from the system 10.

SHO uses the resources of multiple base stations 14 and additional signaling. As such, using SHO is not always beneficial for all desired applications under all usage scenarios. For example, when the difference between the additional BTS 14 signal and the signal from the primary BTS 14 is larger, the SHO gain is small and therefore an optimum SHO threshold exists beyond which SHO does not provide an overall gain.

This optimum SHO threshold and the number of BTSs 14 engaged in SHO is a function of the service to be supported and the resultant service requirement because the gain from SHO depends on the service type. For example, real time services benefit from SHO much more than non-real time services. For a delay sensitive service such as voice, when a mobile device's C/I is low, SHO may be used to enhance operating performance by 2-5 times.

For some non-real time services, use of SHO may in fact degrade the system's overall performance because of the multiple downlink transmissions. Multiple downlink transmission use multiple BTS 14 resources and additional signaling which impacts the allocation of resources for other users in the system. This is also an adverse impact on the capacity of the system. For those services, the benefit from SHO gain cannot outweigh the overhead, for example, the capacity impact, caused by SHO. The conventional method is to use SHO irrespective of the service once a mobile device detects multiple BTSs 14 with strong signals. As such, irrespective of the service/application type, a mobile device 12 will enter into SHO.

Of note, while SHO is not defined for the "fat-pipe" packet based versions of current systems (e.g., downlinks of 1×EV-DO/DV and HSDPA), SHO is a feature in the fat-pipe based Mobile Broadband System. The "Mobile Broadband System" is an orthogonal frequency division multiplex ("OFDM") based system being developed by the Nortel Networks wireless technology labs with a similar trigger and approach to resource allocation as with conventional soft handoff.

The present invention advantageously provides a method and system which allows the application of SHO selectively for certain types of services/flows, e.g. delay sensitive services such as voice, live video, to increase coverage for those services; and allows system operators the ability to choose SHO triggering parameters based on service requirements. The result is that the advantage of the SHO is maximized. In addition, a system operator can advantageously choose to deploy a scaled down service package, if required, without SHO and later add SHO if necessary to increase the service offerings. Thus, the trigger for active set membership may remain as defined, e.g., the CDMA standards. However, the trigger for SHO activation is not based solely on more than one BTS 14 being in the active set.

There are therefore two elements of the design which are employed to trigger SHO once there are multiple BTSs 14 in the active set, namely eligibility of service for SHO and activating SHO support, and C/I based trigger conditions (to add or drop a link) depending on the service to be supported. In addition, it is contemplated that SHO triggers can also be based on one or more additional factors such as received signal strength, BTS 14 loading, the velocity and location of mobile device 12. Of note, the SHO trigger can be based on the service type.

Eligibility of a Service for SHO and Activating SHO on a Per User and Per Service Flow Basis In accordance with the present invention, SHO can be supported for a specific application or service of a mobile device 12. In addition, it is possible that only some of the traffic and signaling flows associated with the service or application (which require SHO for service enhancement) are supported with SHO while others do not use SHO. Accordingly, mobile device 12 can support multiple services, with none, a subset or all of the services being in SHO.

As used herein, the term "High QoS service" represents a service that can use SHO to get an overall performance benefit including achieving a desired coverage level. Although this is indicated as a service, only certain flows of a given service may require SHO. In this case "High QoS flow" should be used in the place of "High QoS service" in the following descriptions.

Depending on the end-to-end QoS provisioning mechanism, the identification of a traffic flow of a service for SHO support and the activation of SHO can be different. Three ways of activating service dependent SHO to address different methods of QoS provisioning mechanisms are provided by the present invention.

Method 1: a Mobile Device 12 is Required to Notify the BTS 14 Prior to Launching a Certain High-QoS Service.

In accordance with this method, a mobile device 12 may subscribe to a High QoS service as a part of a service level agreement ("SLA") in addition to other services offered by the operator in which a mobile device has to specifically make a request prior to launching the application, e.g. use of a Session Initiation ("SIP") protocol. High level services can be identified, for example, by one or more of a QoS Tag, Service Level Agreement Validation ("SLAV"), or traffic profiling. If a user is subscribed to at least one High QoS service, a system operator may configure the system to allow the mobile device 12 to use SHO whenever the C/I requirements for SHO with relation to that specific service are met.

The end user applications (or a flow analysis device inside the network) must mark the packets belonging to the specific flows of a service that may require SHO or certain level of QoS. In the latter case, the wireless system 10 treats certain QoS types as requiring SHO according to a system capability criterion. All packets corresponding to the High QoS flow are sent to multiple base stations 14 from the radio network controller ("RNC") 16 or from the mobile device 12 as specified in the specific SHO scheme. For this purpose, for the downlink (communication to the mobile device 12), a flow identification method should be provided. Whenever a packet is received for a high QoS flow for an existing user subscribed to the high QoS service, SHO is applied for that service and the base station transceiver systems 14 are instructed to allocate resources in accordance with the SHO scheme that is used. For the uplink (communication from the mobile device 12), the mobile device 12 uses internal algorithms to determine which of the flows are the high QoS flows and requests resources for those flows from BTSs 14 in the active set.

Figure 4:
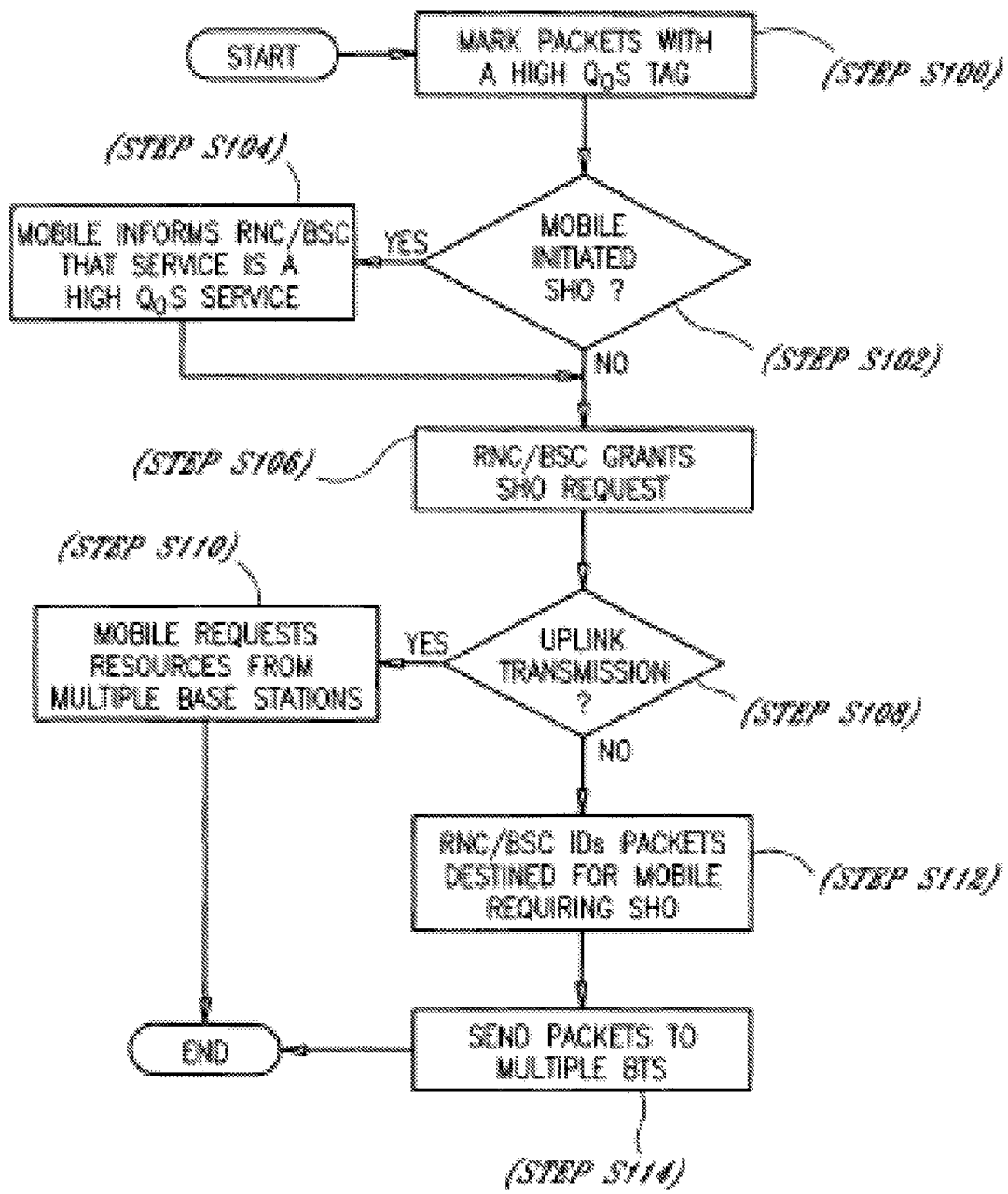
FIG. 4 is a flow chart of a resource reservation process of the present invention when the mobile device is required to notify the BTS.

The resource reservation process when the mobile device 12 is required to notify the BTS 14 is described with reference to FIG. 4. Packets associated with the service are marked with a QoS tag (step S100), e.g., Differentiated Services Code Point ("DSCP"), either by the applications in the end points, i.e., the mobile and the corresponding node or, in the downlink direction, by flow analysis devices in the network. In the case of mobile device initiated SHO (step S102), the mobile device 12 will inform the radio network controller/base station controller ("RNC/BSC") 16 (via BTSs 14) prior to use that the service is a High-QoS service (step S104).

The RNC/BSC 16 grants the SHO request (step S1006, taking into consideration the loading condition of the potential neighboring BTSs 14. The relative signal strength and speed of the mobile device 12 are also considered at this stage. If SHO criterion is already met for that service, the SHO procedures are followed to establish SHO links (add/drop links) as required for the downlink and/or uplink (resource allocation, etc.). For uplink transmissions (step S108), the mobile device 12 requests resources from multiple base stations as specified in the SHO procedure for a particular air interface technology (step S110). For the downlink, the RNC/BSC 16 identifies the packets destined for the specific mobile device 12 that requires SHO (step S112), e.g., based on the specific QoS tag in the packet, and sends the packets to multiple BTSs 14 (e.g., 14a and 14b) with appropriate framing in accordance with SHO processing (step S114). Some systems may need to have SHO frames identified by the physical layer for SHO processing and this should be included in the media access control/radio link protocol ("MAC/RLP") header or physical layer header as required on a frame by frame basis.

Method 2: a Mobile Device 12 is not Required to Notify the System Prior to Launching a High-QoS Service.

In accordance with this method, a mobile device may subscribe to a High QoS service as a part of the SLA as in the first method, but the mobile device 12 is not required to request the launch of the SHO feature. The mobile device 12 may send/receive a High QoS packet any time, uncontrolled in either the uplink and/or the downlink direction. In this case, the first packet for that service indicates the new flow to the network control entity, thereby triggering SHO will be triggered. The other steps are similar to the first method when the mobile device 12 is required to notify the BTS 14 as described in detail above.

In certain systems, the mobile device 12 may not be required to request the launch of the SHO feature for all High-QoS services. However, in some systems, a select number of High QoS services may not require specific grants prior to launching the applications but a few services may be allowed to request specific grants as in Method 1, described above.

Figure 5:
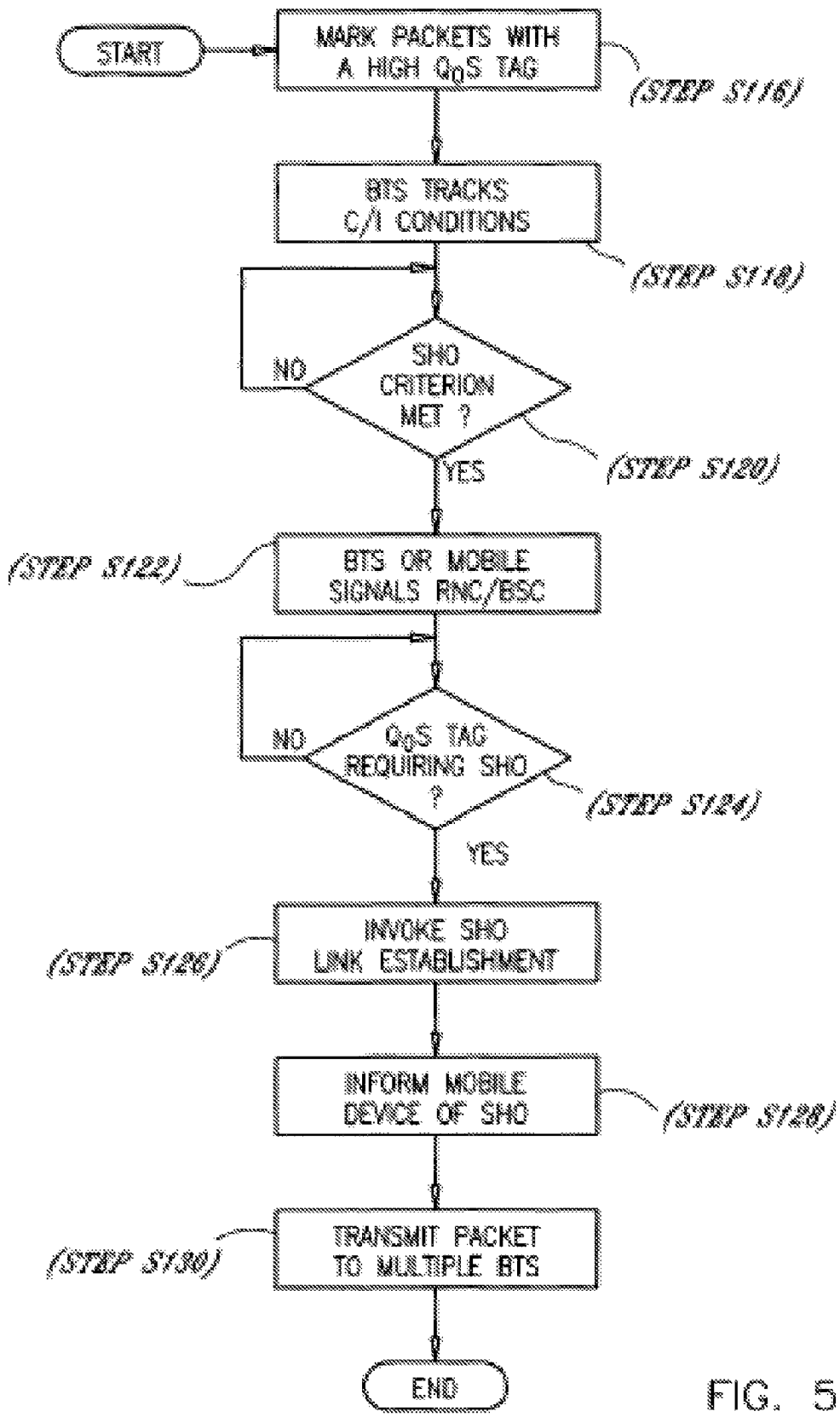
FIG. 5 is a flow chart of a resource reservation process of the present invention when the mobile device is not required to notify the BTS.

The resource reservation process when the mobile device 12 is not required to notify the BTS 14 is described with reference to FIG. 5. Packets associated with the High QoS service are marked (step S116), e.g., with a specific DSCP code point, either by the applications in the end points, i.e., the mobile device and the corresponding node, or in the downlink direction, by flow analysis devices in the network. The BTS 14 or mobile device 12 continuously tracks the C/I conditions of the radio link (step S118) and determines when SHO should be used selectively for some services. If the SHO criterion is met (step S120), the BTS 14 or mobile device 12 signals the RNC/BSC 16 that SHO may be required (step S122). The RNC 16 continuously checks the packets in the downlink direction to determine whether the packets have specific QoS tags. Once a QoS tag requiring SHO is found (step S124), the RNC (1) invokes the link establishment procedure for SHO (step S126), including resource allocation of multiple BTSs 14, (2) informs the mobile device 12 of the SHO operation (step S128) and (3) sends packets to multiple BTSs 14, as required (step S130).

The resource allocation of multiple BTSs 14 may be done on a packet by packet basis or as a regular allocation. Some systems may need to have SHO frames identified by the physical layer for SHO processing and this should be included in the MAC/RLP header or physical layer header as required on a frame by frame (PHY or MAC) basis. For the uplink, an application on the mobile device 12 marks the packets with the QoS tag which is used by the control system to request SHO link establishment. Of note, once a service is identified as eligible to enter SHO, the next action preferably is the trigger for SHO.

Method 3: a System which does not have Explicit Mechanisms for Indicating QoS Requirements of a Traffic Flow.

In such a system, the identification of service flows may be done based on traffic prediction and analysis schemes, monitoring schemes or performance analysis techniques. For example, there may be a mechanism to monitor performance degradations, e.g., number of transmission errors, and to use this information as the trigger to improve QoS by means of SHO or other means. Depending on the C/I condition, the controller may activate SHO for that flow. Some systems may need to have SHO frames identified by the physical layer for SHO processing, so this is included in the MAC/RLP header or physical layer header as required on a frame by frame (PHY or MAC) basis. Another way to address QoS is to analyze the traffic behaviors to understand the service types using techniques that are beyond the scope of this document.

C/I Based Trigger Conditions Depending on the Service to be Supported

The C/I trigger conditions to activate SHO are changed according to the QoS requirements of the service. A brief description is provided as follows:

Adding a link: A new BTS 14 link will be added if a mobile device's 12 current C/I is inadequate to support a given service, e.g. >0.1% packet error rate or C/I<−3 dB, or if the addition of the link is expected to increase the overall system resource usage efficiency. Such an expectation is determined by assessing the pilot strengths of active set BTSs 14 to determine whether certain differential conditions are met which depend on the QoS requirements of the service.

Dropping a link: A BTS 14 link in SHO will be dropped if the mobile device's C/I condition received from a single BTS 14 or a subset of BTSs 14 of the BTSs 14 involved in the SHO improves to a level where the service can be supported without the weakest BTS 14 link (the BTS 14 having least pilot power) and the dropping of the weakest BTS 14 link would result in an increase in the overall resource efficiency. However, in order to avoid a ping-pong effect, the drop criterion is always kept as a less stringent criterion than the add criterion. In addition, as in the current systems, system loading will be also be used link drop determination.

Figure 6:
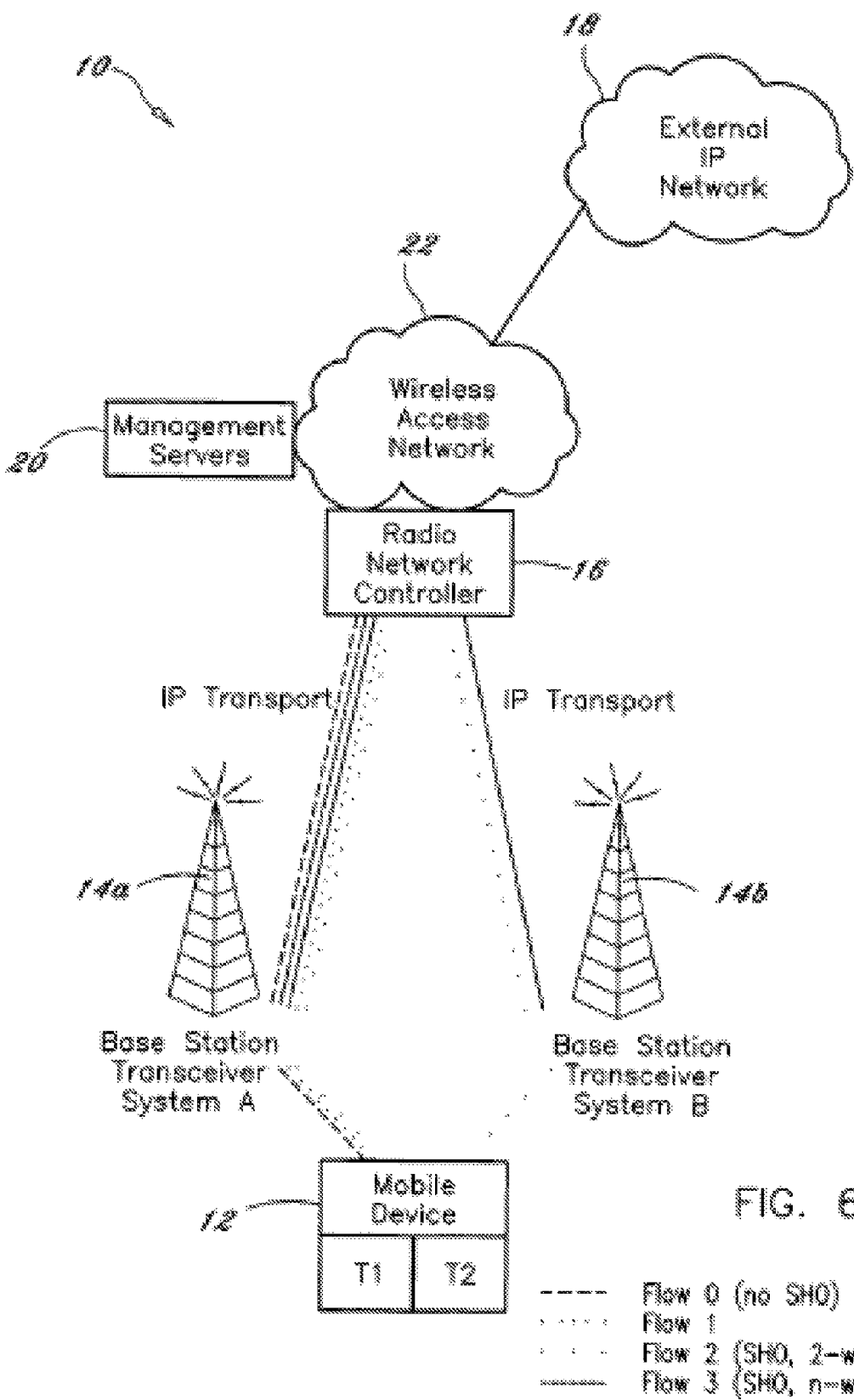
FIG. 6 is a diagram showing the flow of downlink data communication processing for the present invention.
Figure 7:
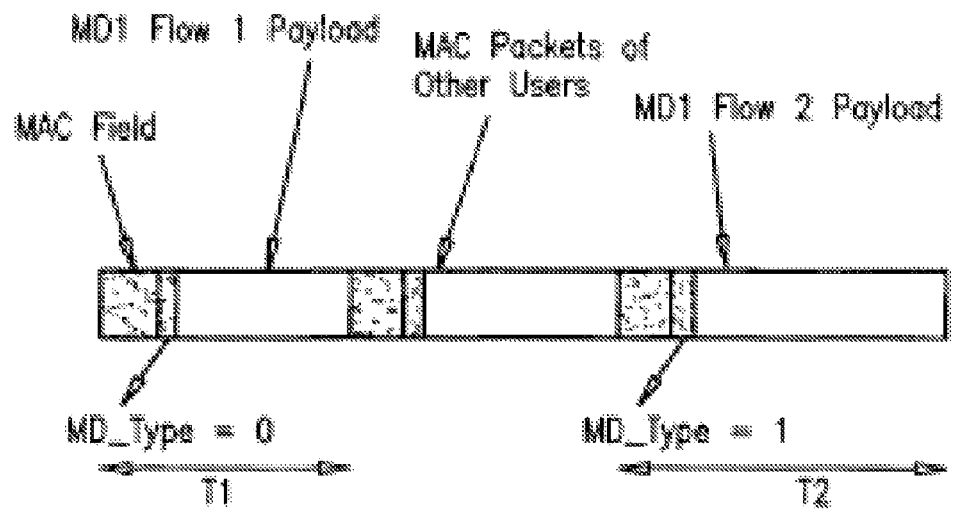
FIG. 7 is an exemplary MAC framing diagram constructed in accordance with the present invention.
Figure 8:
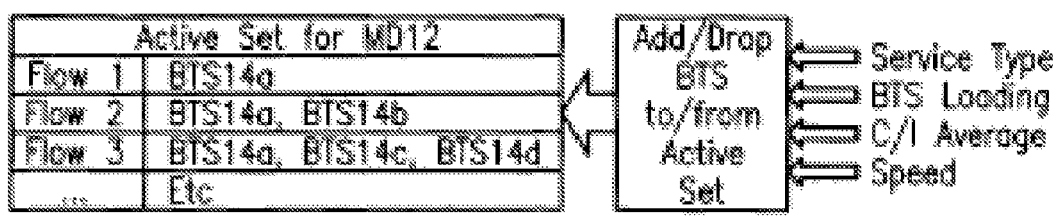
FIG. 8 is a diagram showing exemplary packet flows for a mobile device active set of BTSs.

An example of typical downlink communications in the present invention is described with reference to FIGS. 6-8. FIG. 6 is a diagram showing the flow of downlink data communication processing for the present invention. FIG. 7 is an exemplary MAC framing diagram constructed in accordance with the present invention in which each packet includes a header indicating whether it is to be operated in SHO or another macro-diversity mode. As is shown in FIG. 6, mobile device 12 is supported by a plurality of base station transceiver systems 14a and 14b. The active set for mobile device 12 is shown in FIG. 8 for packet Flows 1-3. The service associated with Flow 0 does not support or is not in soft handoff. Macro-diversity for Flow 1 is provided by fast cell switching ("FCS"), while Flows 2 and 3 are in or are supported by SHO. Of note, BTS 14c and BTS 14d described for Flow 3 in FIG. 8 are omitted from FIG. 6 for the sake of simplicity, it being understood that BTS 14c and 14d, like BTSs 14a and 14b, are coupled to RNC 16 via IP transport links.

FIG. 7 also shows an exemplary MAC framing diagram in which each packet includes a header indicating whether it is to be operated in SHO or another macro-diversity mode, e.g. fast cell switching. In FIG. 7 this header is shown as "MD_Type". Setting the MD_Type value to a predetermined value is used to indicate the macro-diversity mode. For example, as shown in FIG. 7, the value "0" is set for the MD_Type in Flow 1 in which this value corresponds to fast cell switching. The MD_Type in Flow 2 is set to "1" which corresponds to SHO. It is also contemplated that common channel signaling can be used to inform mobile device 12 as to which data flows and/or services are in SHO. In this manner, the present invention advantageously allows a multitude of different types of macro-diversity schemes to be implemented within a system and/or for different services within a system.

Figure 9:
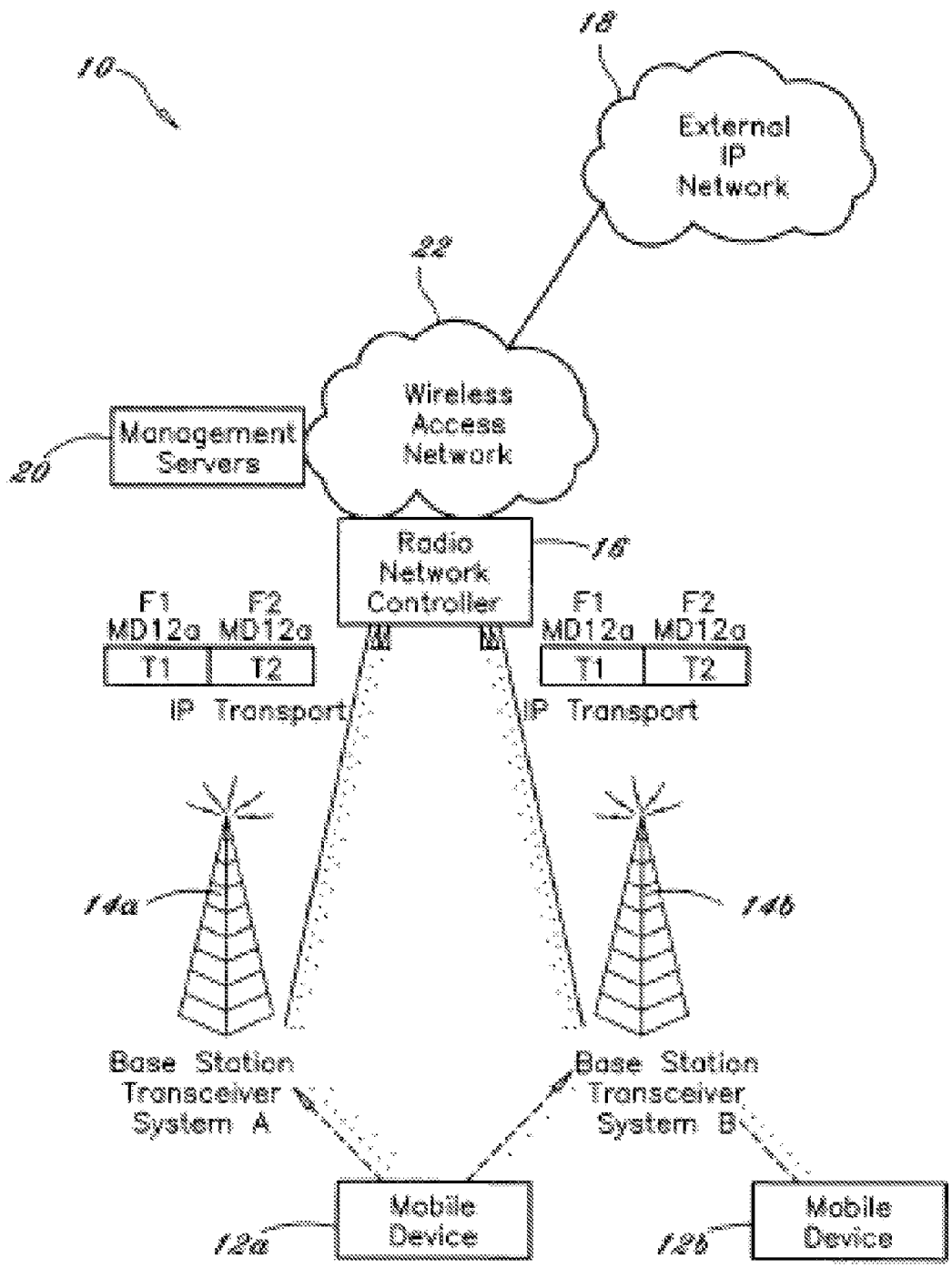
FIG. 9 is a diagram showing the flow of uplink data communication processing for the present invention.

FIG. 9 is a diagram showing the flow of uplink data communication processing for the present invention. FIG. 9 shows two mobile devices 12a and 12b (referred to collectively herein as mobile device 12) in which mobile device 12a (MD 12a) is using FCS for Flow 1 and SHO for Flow 2. Flow 0 is not in SHO and/or the service corresponding to Flow 0 does not support SHO. Mobile device 12b (MD 12b) has its own two flows in which its Flow 0 is not in SHO and/or the service corresponding to Flow 0 does not support SHO. Flow 1 from MD 12b is using FCS. Of note, Flows 0 and 1 from MD 12a and MD 12b are labeled as such for convenience and do not mean or imply that the flows themselves are identical.

The present invention advantageously allows the economical use of SHO, such that its benefit is maximized while the onerous resource requirements for supporting this feature are minimized. The present invention has the potential use in standards supporting packet based fat-pipe transmission, such as in OFDM/MIMO based IEEE 802.16 standards. The present invention can also be introduced in Wideband Code Division Multiple Access ("WCDMA") or CDMA standards if SHO is included as a feature for the fat-pipe downlink.

The present invention provides a method and system to facilitate the implementation of coverage improvement techniques without centralized resource control thereby significantly simplifying cellular communication system access network architecture. In accordance with the present invention, the multi-base resource reservation required for downlink/uplink SHO or interference avoidance schemes are performed by the mobile device 12 (after obtaining resource availability information from multiple base stations 14) rather than a central entity in the network such as the RNC 16.

Of note, while the system and method are described herein using soft handoff, the system and method are applicable to any coverage improvement scheme (soft handoff, interference avoidance, etc.) which requires coordinated multi-base resource reservation.

Figure 10:
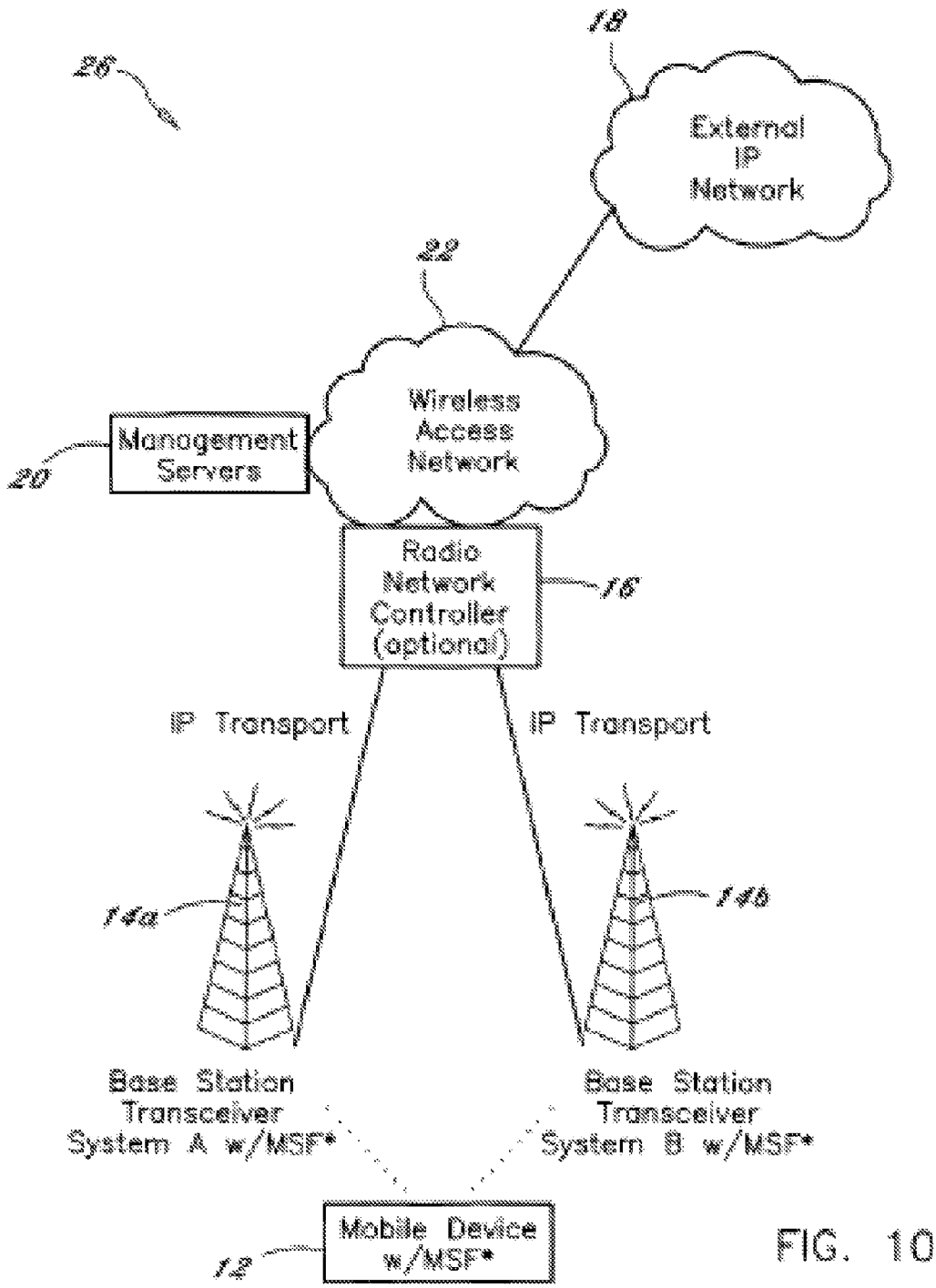
FIG. 10 is a diagram of another exemplary system constructed in accordance with the principles of the present invention arranged to support resource reservation/coordination.

FIG. 10 is a diagram of another exemplary system 26 constructed in accordance with the principles of the present invention arranged to support resource reservation/coordination. System 26 is the same as system 10 shown in FIG. 3 with the exception that the functionality provided by MSF 24 in system 10 is provided by mobile devices 12 and BTSs 14. As such, RNC 16 in system 26 is optional and BTSs 14 can communicate directly with wireless access network 22 and the elements directly or indirectly coupled thereto. The method described herein can be applied to enable both downlink (BTS 14 to mobile device 12) and uplink (mobile device to BTS 14) resource coordination. As noted above, although the system and method are explained with reference to SHO, the system and method of the present invention can be applied to any scheme, such as an interference avoidance scheme or power management scheme, requiring base station resource coordination. In order to simplify access network architecture, the current invention provides resource reservation by the mobile devices engaged in SHO instead of a central entity such as an RNC.

Resource reservation/coordination in accordance with the present invention is explained in detail with reference to FIGS. 11-14. In general, BTSs 14 typically have a pool of resource units reserved for SHO. The MSF informs the BTSs 14 of how many resource units to reserve by monitoring the loading conditions of the BTSs 14. It is also contemplated that the BTSs 14 themselves can independently monitor themselves and reserve resource units, but resource units in such a case need to be a subset of a common SHO resource pool. The BTSs 14 in turn alert mobile device 12 as to available resource time units in the BTSs pool. Mobile device 12 determines available resource time units common to all active set BTSs 14 and informs the active BTSs 14 of the same. In accordance with the present invention, resource reservation can occur (1) at the beginning of a service/session set up such as for regular constant bit rate ("CBR")-like traffic, e.g., voice, (2) for a specified time period or (3) dynamically based on packet availability. The method for the first two cases are similar and are explained below as different aspects of "Batch Reservation". The third case is explained under the heading "Dynamic Reservation". Each case is identified as follows:

A. Batch reservation during session set up: A mobile device requests allocation/reservation of resources during session set up for an entire data session, e.g., CBR-like traffic such as voice over IP ("VoIP").

B. Batch reservation for a specified period: Allocation/reservation of resources is made for a specified period, i.e., time or for a multiple number of physical layer/MAC frames.

C. Dynamic Reservation: In this case, the resources are dynamically reserved as and when traffic is available.

As used herein, the term "Resource_Time_Unit" ("RTU") is defined as a specific time unit of the shared fat-pipe in a fat-pipe system, distinctly identified by a specific time period of a physical layer frame/multi-frame which may have a one-to-one mapping to a MAC frame. This may be a frequency and a time unit, a group of sub-carriers or a frequency and a code unit.

Figure 11:
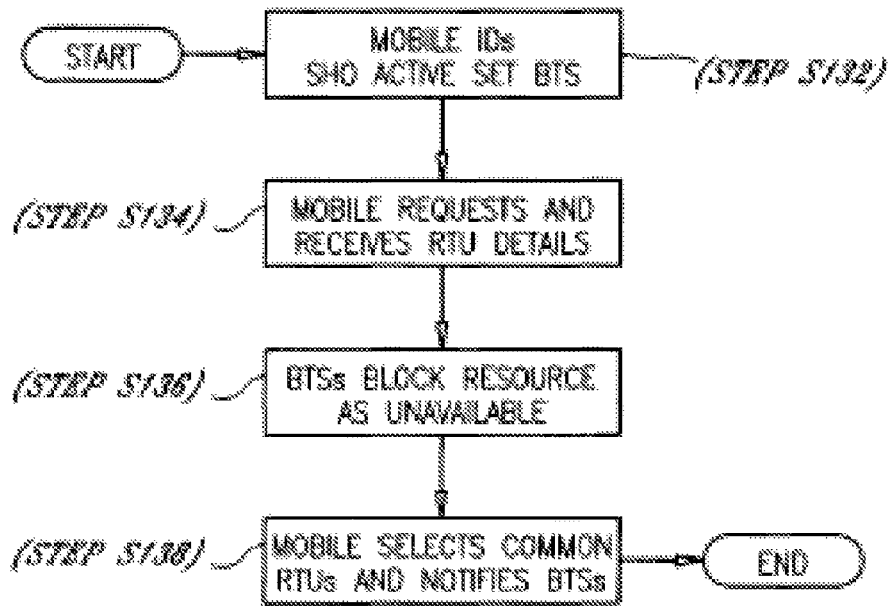
FIG. 11 is a flow chart of a process for batch reservation for an entire session.

Batch reservation for an entire session (case A above) is described with reference to FIG. 11. During session setup the SHO active-set of BTSs 14 are identified by the mobile device 12 (step S132). The mobile device 12 requests all SHO BTSs

14 to send the details of the available RTUs for SHO and allowed maximum reservation, both of which depend on the subscriber profile and the loading level of the BTSs 14. The BTSs 14 inform the mobile device 12 of the available resource units and corresponding time slots (step S134).

The BTSs 14 block this resource as unavailable for consideration for further SHO reservation requests until the mobile device 12 responds with a proposed reservation time (step S136). This helps to avoid double booking of resources. Although it is marked as unavailable, a BTS 14 is free to use the resource for current transmissions, e.g., for non-SHO users until the mobile device's 12 response is received. Since the response (selection of a time slot out of the proposed time slots, as indicated in the next step) from the mobile device is sent very quickly, this time period is expected to be small (<10 milliseconds) and will not cause blocking of other mobile devices trying to set up SHO sessions. Even if blocking occurs, the request can be handled immediately after serving a request with the only result being some additional delay. This can also be resolved by allowing multiple requests at substantially the same time (as in step A.4 below), or by allowing the BTS 14 to broadcast the available time slots and allowing mobile devices to independently choose them (which might cause collisions).

Upon receiving the available resources from multiple BTSs 14, a mobile device 12 selects a common RTU(s), e.g., a time slot and corresponding sub-carriers, and uses a dedicated signaling channel to inform all the BTSs 14 or uses the primary BTS 14 which sends the common RTU via the access network to the other BTSs 14 (step S134). The mobile device 12 can also provide several other pieces of information as may be required for the SHO algorithm, such as the sequence number of the LLC frame to be transmitted in the first slot to ensure that the BTSs 14 are all sending the same information.

BTSs 14 may allow processing requests from multiple mobile devices 12, e.g. 12*a* and 12*b* at the same time. For the sake of simplicity, mobile device 12*b* is not shown in FIG. 10, it being understood that mobile device 12*b* can communicate with one or more BTSs 14. In this case, only a portion of available resources can be sent/marked to a mobile device allowing the ability to send/mark another non-overlapping portion of the available resources for other SHO allocation requests. However, this segmentation and sending only a portion of the available slot space increases the probability that a mobile device 12 will fail to find a matching set of free slots. This probability increases as the number of simultaneous requests increases. One solution to this issue is to subdivide the available resource space to increase the number of RTUs. This way, the probability of finding a match is higher.

For example, assuming that SHO users occupy 50% of resources in average, with 40 RTUs, two simultaneous requests can be allowed with >99% success rate (for 2-way handoff). With 100 RTUs, up to 5 simultaneous requests can be handled with a 99% success rate. There are several ways to improve the success rate. One way is to arrange the available time slots in some order, e.g., according to RTU ID number. When a mobile device selects a time slot, the mobile device can always select the RTU with the lowest ID number (if there are multiple matches). This helps to free up the resources with higher ID numbers for SHO attempts, thereby increasing the probability for a match.

It is also contemplated that another enhancement technique is to implement a prioritization process for the available RTUs with the assistance of the mobile device 12. The mobile device 12 assigns a priority index for the RTUs which are freely available in multiple BTSs 14 and informs its active set BTSs 14. The priority index is proportional to the number of BTSs 14 that are available. The active set BTSs 14 in turn, combine all such priority indications from all the mobile devices 12 and derive a combined priority index for all of the RTUs. This combined priority index is sent to the mobile devices with the resource availability message. Whenever a mobile device 12 has multiple RTU selection opportunities, the mobile device 12 selects the RTU with lowest priority index, meaning high priority RTUs are kept for future SHO mobile devices which might find it difficult to select a common RTU. This increases the probability of finding a RTU match across multiple BTSs 14.

Another way, is to segment the RTU space (A, B, C, D, and E). Once a mobile device 12 is active, a BTS 14 provides the list of segments according to the SHO loading condition of each segment. Then, the mobile device 12 assigns itself to one of the segments according to a combined Priority Index ("PI"). This PI is evaluated using (1) the priorities each BTS 14 in SHO active set indicated for each segment and (2) the mobile device's 12 chance of connecting to a BTS 14 as a SHO user. When it goes into SHO, all the SHO BTSs 14 can indicate the free resources in that segment only, thus increasing the matching probability for finding a matching RTU from multiple BTSs 14. The loading-based segment selection ensures that each segment has fairly equal number of SHO users.

Initial resource reservation period may be evaluated based on minimum service rate and a fixed MCS for SHO, any other service requirement or based on traffic flow monitoring reports. The resource reservation may be adjusted later (reduced or increased) by the mobile device 12 or any of the BTSs 14, e.g. based on the traffic availability and loading of the base stations. On the downlink, BTSs 14 transmit to the mobile devices 12 from the beginning of the allocated period. If the transmission to the SHO mobile device is completed before the allocated period terminates, the BTSs 14 independently schedule other non-SHO users within the same time period. Furthermore, some sort of "end of transmission" marker may be sent from (all of) the BTS 14. If it is not done, the mobile in SHO may record a "transmission error" because the frames received from each of the BTS 14 will not match.

On the uplink, a mobile device 12 may decide to release the allocated amount a time 'T' ahead of the actual scheduled time, if the mobile device 12 observes that it does not have sufficient data to be sent during the relevant period. The period 'T' allows the BTS 14 to independently allocate that time to another non-SHO user. In addition, a mobile device 12 can cancel the repeated reservation at any time depending on a traffic monitoring output or a service disconnection order. Mobile device 12 can also inform BTSs 14 of the amount of data in its (mobile device 12) buffer so that the BTSs 14 can release some of the reserved SHO resource units to non-SHO units. This is particularly applicable to bursty data.

Batch reservation for a specified period (case B) is now described. In some cases, the services requiring SHO may not be present initially and a flow is subsequently identified as requiring SHO using a traffic monitoring/identification process. For constant bit rate traffic, the periodic resource reservation can be repeated until otherwise notified by the mobile device 12. For some cases, the resources may be reserved on a regular basis for a short period of time. The method is as follows:

The resource co-ordination process in this case is similar to the procedure for batch reservation for an entire session described above (method for case A above) except that the reservation can happen upon identification of a regular data flow which is either forecasted to be available for some time, such as may be based on a traffic monitoring process, or require soft handoff for better system efficiency and estimated to be efficiently operated if resources are reserved for some time (as opposed to reserve resources on a packet-by-packet basis as indicated below).

Figure 12:
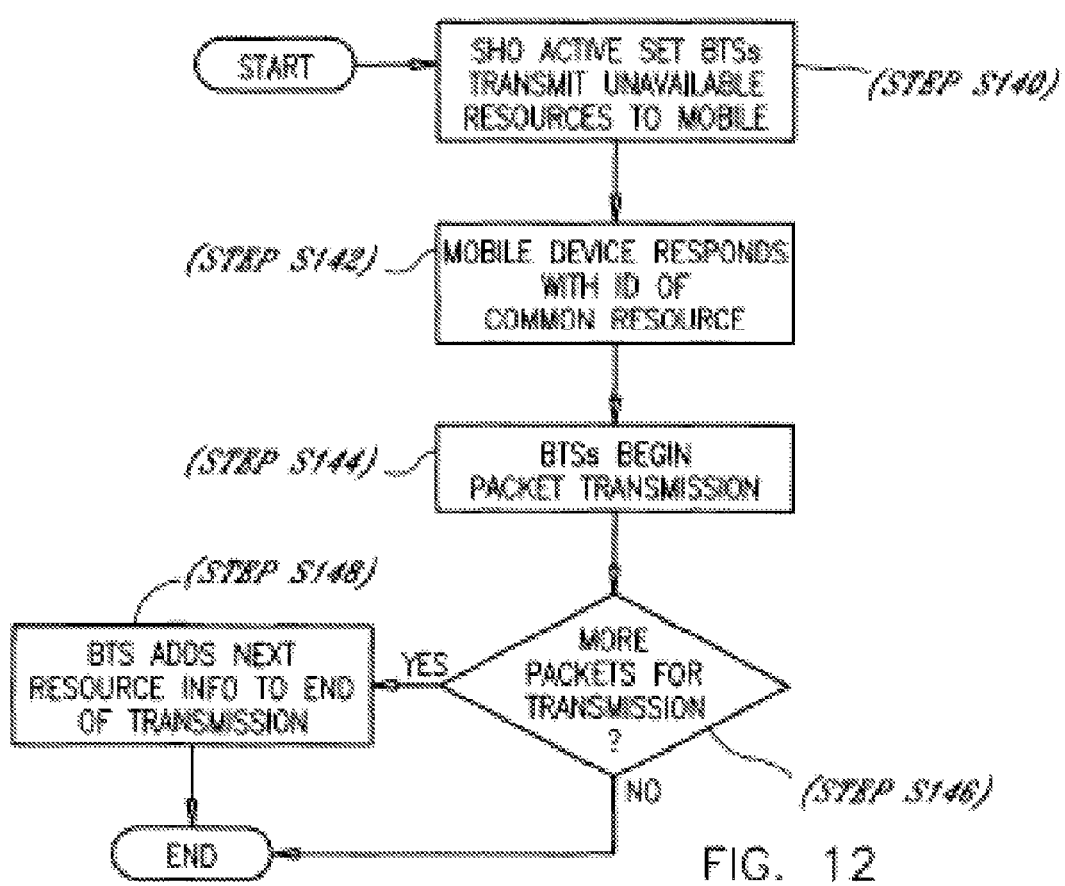
FIG. 12 is a flow chart of a dynamic reservation process for downlink communication.
Figure 13:
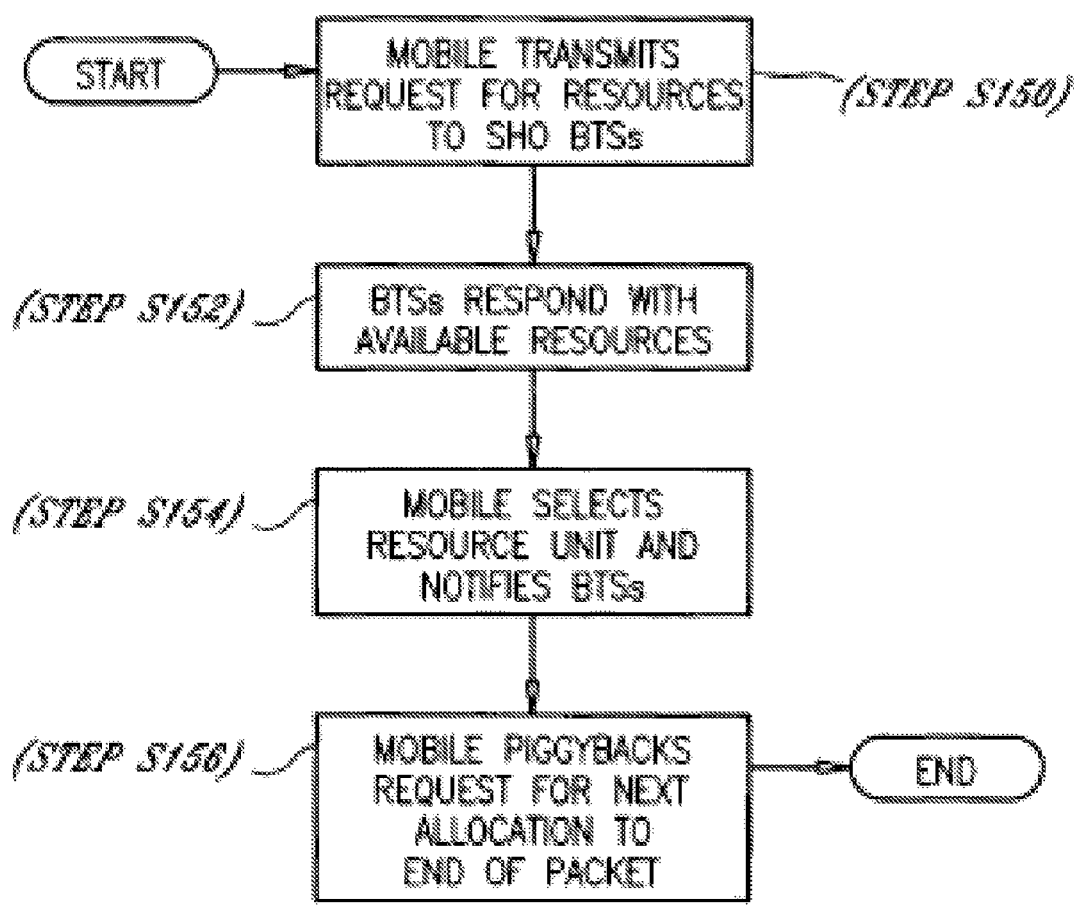
FIG. 13 is a flow chart of a dynamic reservation process for uplink communication.

Dynamic reservation (case C above) is described with reference to FIGS. 12 and 13. In the dynamic reservation case, the identification of a high quality of service ("QoS") SHO enabled service's packet/flow triggers the resource reservation process. The dynamic reservation process for downlink communication is described with reference to FIG. 12. On the downlink, the SHO active set member BTSs 14 transmit their available resources, e.g., RTUs, to the mobile device 12 within a specific time period (step S140). The time period may be agreed upon previously depending on the buffer occupancy or a fixed value provided to the system by the operator. The mobile device 12 responds with the identification of a common resource (step S142), at which time the BTSs 14 begin their packet transmission (step S144). Depending on available buffer size, if more packets are available for transmission (step S146), the BTSs 14 piggyback their next resource availability to the end of the transmission (step S148). This cycle repeats every time a packet requiring SHO is received without a past reservation of SHO transmission time.

The dynamic reservation process for uplink communication is described with reference to FIG. 13. On the uplink, upon detection of a packet for SHO, the mobile device 12 transmits a request for available resources to all the SHO BTSs 14 (step S150). The SHO BTSs 14 respond with the available resources (step S152) and the mobile device 12 matches these and selects one resource unit (or multiple if allowed), informs the BTSs 14 of its selected resources, and transmits on the common resource (step S154). Again, the mobile device 12 piggybacks a request for the next resource allocation and the amount, and the process repeats until the mobile device signals the end of the transmission (step S156). This exchange may happen on a burst by burst basis depending on the application.

An alternate method in which BTSs 14 are required to broadcast/multicast the available resources to all of the mobile devices in its coverage area or to a subset of mobile devices which may engage in a SHO session with the BTS 14 is explained below. This alternate solution reduces the amount of messaging required with the additional requirement of maintaining and updating a resource availability table at the mobile device. If this is done, mobile device does not have to make a request for available resources every time it requires new/additional resources. When multiple mobile devices request the same resource, a collision occurs and a BTS 14 can process only one request. In that case, the BTS 14 informs the unselected mobile device(s) about the failure and that the unselected mobile device(s) need to make a separate request for resource reservation.

This may be implemented by first informing the mobile devices of the available resources when it comes close to a BTSs 14 boundary, later updating the resource reservations and later releasing the resources. This method can also be implemented by having the BTS 14 broadcast all the available resources to the mobile device on an exclusive channel. The mobile device can then independently select the best time slot common to a majority of the SHO-BTSs 14.

Also note that active set maintenance can also be done at the device in all of these cases to further simplify the architecture. However, an active set table is needed on a per mobile device basis at a central entity to do some higher layer processing such as IP multicasting or IP packet selection. In addition, in all of the above cases, it is contemplated that the secondary BTS's communications with the mobile device may happen explicitly using a dedicated or shared channel or, it may happen via the network, e.g., via the primary BTS 14.

Figure 14:
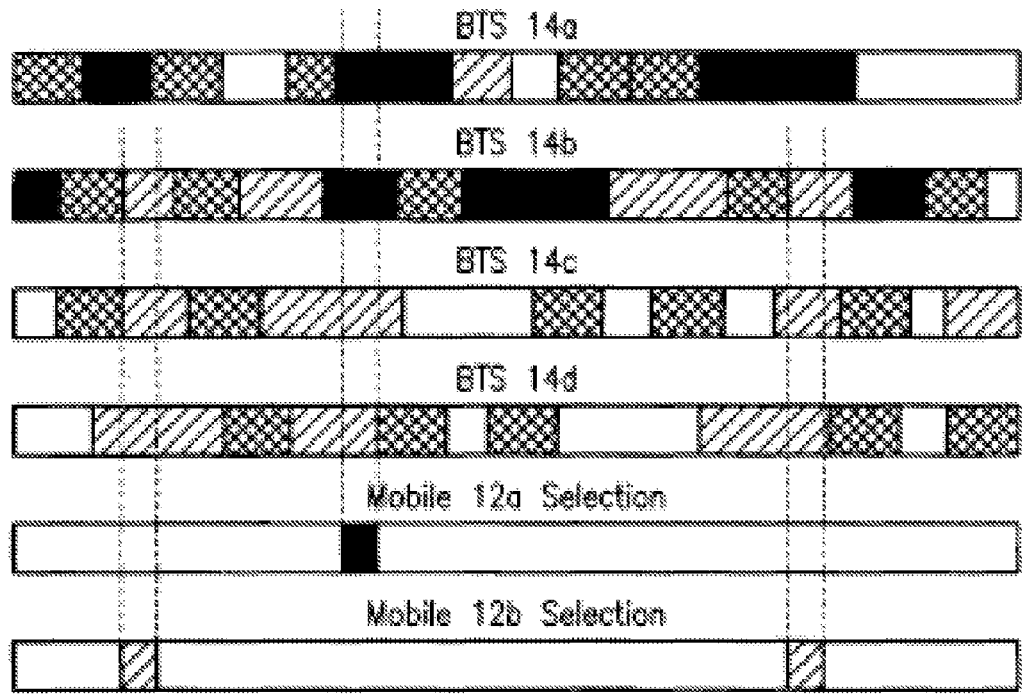
FIG. 14 is a diagram depicting a window for resource reservations for mobile devices using a plurality of BTSs.

FIG. 14 shows an exemplary diagram depicting a window for resource reservations for mobile devices 12a and 12b using BTSs 14a-14d (14c and 14d are not shown in FIG. 10, it being understood that BTSs 14c and 14d are merely two additional BTSs which can be in communication with mobile devices 12a and 12b). As is shown in FIG. 14, using any of the above described resource reservation techniques, mobile device 12a has been granted one resource unit per window by BTSs 14a and 14b. Mobile device 12b has been granted two resource units per window by BTSs 14b, 14c and 14d.

Other components used to complete the set of soft handoff functions implement support for multicasting to multiple base stations for the downlink and combining or selection of packets received from multiple base stations for the uplink which can be easily achieved within a distributed architecture. Interference avoidance schemes such as coordinated power adjustment or coordinated stopping of specific transmissions in specific times do not require even the above mentioned functions (the interference avoidance scheme may however require an indication of the available data packet sizes to dynamically stop the transmissions in the active set base stations in order to reduce the over the air messages from mobile device).

Referring again to FIG. 3, the present invention also provides a system and method which provides soft handoff in a distributed architecture in which the RLP processing is done at the BTS 14. In addition to providing a means to use conventional soft handoff elements such as active set management, multicasting of packets to soft handoff BTSs 14, etc., within this environment, the present invention provides additional features such as fixed segmentation of RLP PDUs for downlink soft handoff, a resource reservation database at the RNC to avoid overlapping of reservations in different BTSs 14, explicit resource, e.g., time units, reservation at different BTSs 14 on the basis of average service requirements for both downlink and uplink soft handoff (slow updates are made to the resource reservation to ensure that the variation in packet arrivals over time is accounted for), reutilization of excess resource reservations by BTSs 14 for non-soft handoff transmissions, buffering of downlink data packets at the BTSs 14 to address the bursty nature of traffic with slow changes to reservations based on buffer status, accommodation for HARQ retransmissions from/to a single BTS 14 in a separate non-SHO scheduling interval and reassembly of RLP PDUs into higher layer packets at the BTS 14.

In accordance with the present invention, downlink and uplink soft handoff is implemented without requiring radio MAC/RLP processing at a central location such as RNC. Higher layer protocol centralized processing is also advantageously minimized.

The centralized control functions used are advantageously limited to active set management and coordinated per-user resource reservation among multiple base stations 14. The main bearer functions carried out by the central entity include multicasting of the higher layer (e.g., IP) packets in the downlink, and reordering and discarding of duplicated higher layer packets in the uplink.

The active set management function carried out by the central entity, such as the RNC 16, is similar to the conventional procedure available in current cellular systems, i.e., use of the pilot information transmitted by the BTS 14 to update a mobile device's 12 active set. A BTS 14 is added to the mobile device's active set dynamically depending on the relative carrier to interference ("C/I") measurements, e.g. when C/I difference is less than 3 dB, provided the new BTS 14 is not in an overload condition and unable to support additional mobile devices.

The scheduling of a MAC/RLP frame should happen at the same time for multiple BTSs 14 (for both uplink and downlink) in order to obtain the soft handoff gain. For both uplink and downlink, the soft handoff resource reservation at different BTSs 14 is done by maintaining a database at the RNC, and updating the database such that the required user transmissions for soft handoff are synchronized in the different cells of the RNC. BTS 14 can request an increase in the SHO scheduling interval from MSF 24 if buffers are overloaded in the BTS 14. This resource reservation process can be optimized by using packing algorithms as well as the concept of zoning where collocated BTSs 14 can be zoned and soft handoff resource reservations independently applied to the zones. Since soft handoff resource reservation does not need to be done dynamically on a packet by packet basis, the messaging delay from RNC 16 to BTS 14 is advantageously minimized. Although a reasonable time window is reserved for a soft handoff user, unused soft handoff time slots for non-soft handoff users should be reused when sufficient traffic is not available to fill the allocated time window. As is explained below, to minimize messaging delays, the mobile device 12 determines the Adaptive Modulation and Coding ("AMC") level for both uplink and downlink soft handoff transmissions depending on the estimated combined C/I of the active transmission links.

Aspects of the method provided by the present invention element which allows the RLP/MAC frame processing at the BTS 14 are the segmentation of packets for downlink transmission and reassembly of MAC frames for uplink transmission for soft handoff users. For the downlink transmission, a fixed segmentation rule is established so that each BTS 14 does exactly same segmentation of the higher layer packets. This ensures that the same data is sent over an allocated time slot.

Since there is a considerable C/I gain obtained from soft handoff processing, retransmissions (Layer 2 or HARQ) are usually not required for the packets being transmitted using soft handoff. Therefore, dynamic explicit scheduling from the RNC for retransmission of packets which can add significant messaging delay is not required as part of the present invention. Optionally, retransmissions could be done without using soft handoff via the strongest BTS, if the first transmission (with the aid of soft handoff) failed. The failure of the soft handoff transmission is however very unlikely if a reasonable fade margin is used for the soft handoff transmissions.

The elements of the present invention specific to downlink transmission are described as follows. For the downlink, the main differentiators between existing soft handoff methods and the method of the present invention relate to the fact that each BTS 14 performs independent segmentation of the received higher layer packets (e.g., IP packets) into MAC frames and the central entity only reserves per device-based resources for the soft handoff mobile devices. As such, per device-based soft handoff resources are reserved at each of the respective BTSs 14 by the RNC to ensure that the transmissions are done at the same time. If the total allocated time is not used for the soft handoff transmission, the rest of the allocated time can be used by individual BTSs 14 per their discretion. The total allocated time may not be used due to either non-availability of traffic to fill the full allocated time or due to the use of a higher modulation and coding level for transmission which is enabled by the higher signal levels available to the mobile device. In order to have synchronized transmissions, the decision of what part of the available time duration is to be used for the SHO data is also defined in the prior agreement among BTSs 14 (e.g., the first time frames of the allocated period are always used for SHO transmission by all the BTSs 14).

In accordance with the present invention, the RLP buffer is no longer maintained at the RNC with complete coordination of transmissions directly from the RNC. Instead, in accordance with the present invention, a buffer is maintained at the BTS 14 and the RNC is not generally involved in the bearer flow details, except for multicasting the data packets to the soft handoff BTSs 14. However, it should be noted that multicasting is required even without SHO to support fast cell switching. Overflow of buffers is avoided by having the BTS 14 request additional resource reservation from the RNC as the buffer queue increases. Thus, the BTS 14 maintains the RLP buffer, instead of the RNC an in current systems. In addition, the mobile device 12 maintains a signaling channel with the active BTSs 14 to provide a way to acknowledge the packets. Packets are discarded once an acknowledgement is received from the mobile.

Figure 1:
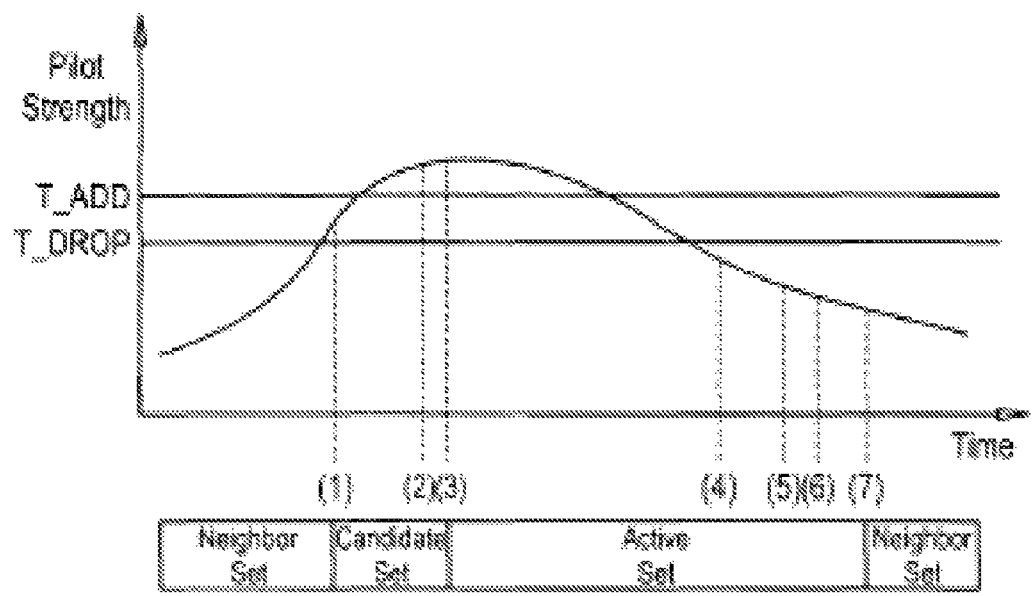
FIG. 1 is a diagram of a typical pilot signal lifecycle for a corresponding BTS.
Figure 2:
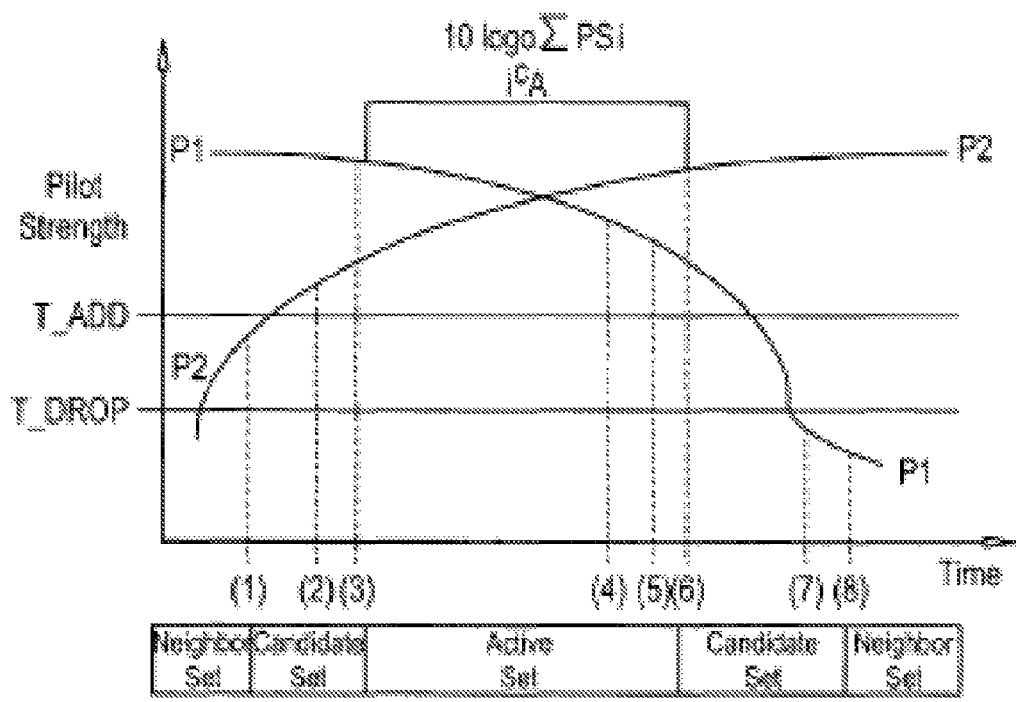
FIG. 2 is a diagram of typical pilot signal lifecycles for pilot signals corresponding to multiple BTSs.
Figure 15:
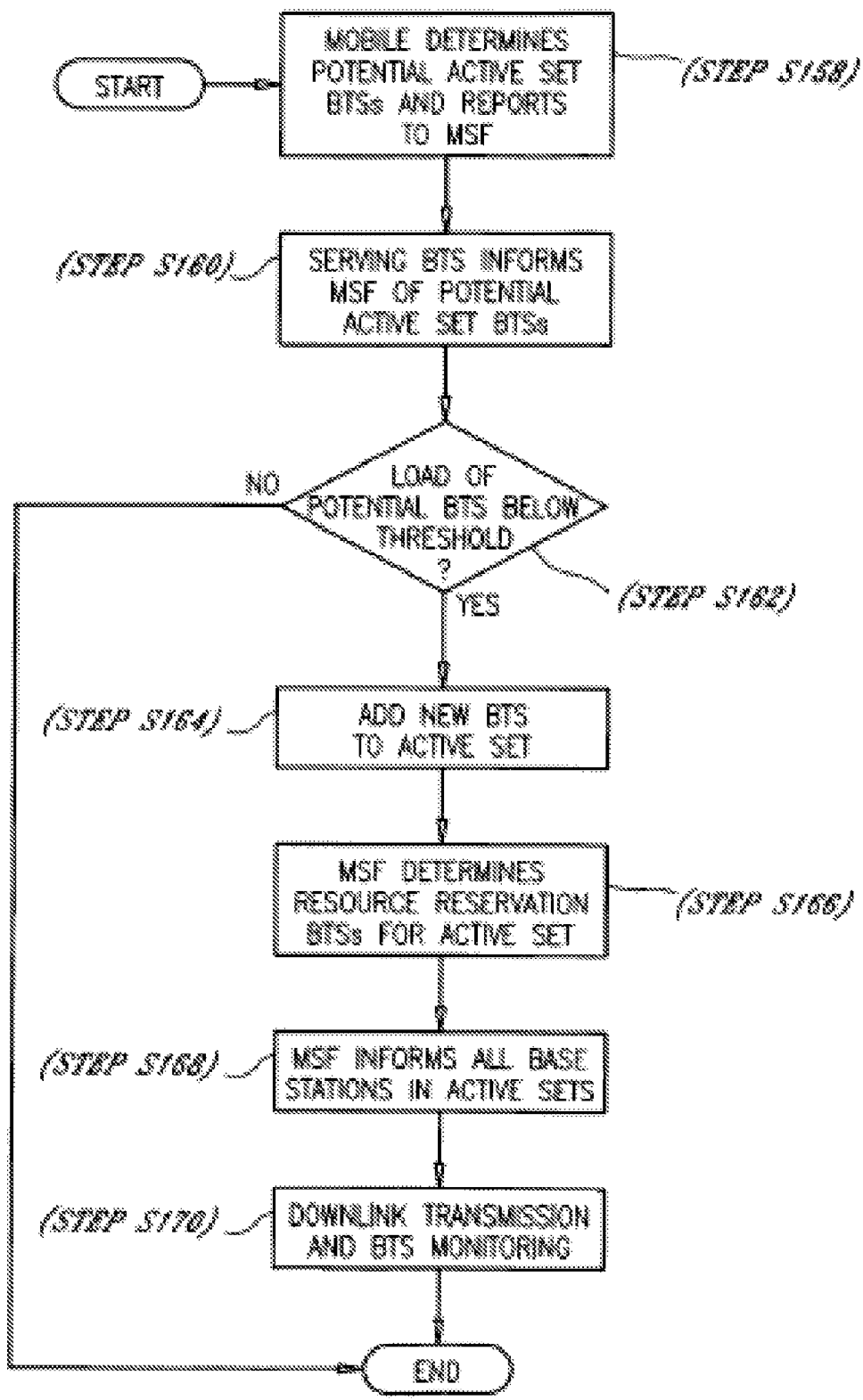
FIG. 15 is a flow chart of a process of the present invention for enabling downlink soft handoff in an architecture with distributed Layer 2 and with multiple antenna processing options.

The process of the present invention to enable downlink soft handoff in an architecture with distributed Layer 2 (MAC/RLP) and with multiple antenna processing options is described with references to FIGS. 1 and 15. Initially, the mobile device 12 determines and reports potential BTS 14 active set members to MSF 24 (step S158). The serving BTS 14 informs the MSF 24 of potential BTSs 14 for the active set (step S160). If the loading of a potential BTS 14 is below a predetermined threshold (step S162), the new BTS 14 is included into active set (step S164) and MSF 24 determines if the soft handoff trigger conditions are also met for the given service. MSF 24 determines resource reservation (e.g., transmission times) for the mobile device's 12 active set BTSs 14 (step S166) and informs all base stations in active set (step S168) including AMC level and any antenna processing option selected by the mobile device. Of note, AMC level and the antenna processing option are selected by mobile device 12 on the basis of combined pilot power/C/I measurements and/or velocity of mobile device 12 and are reported to base stations 14 in the active set. The AMC level and the antenna processing option can be determined by mobile device 12 on a packet by packet basis or for a specific time period. Conservative MCS level choices will minimize the need for HARQ or Layer 2 retransmissions.

The MSF resource reservation period is determined based on a minimum satisfactory service rate and a fixed MCS for soft handoff. The scheduler at each base station 14 accommodates the soft handoff mobile devices 12 as a priority in reserved resource assignments. Making conservative MCS level selections will minimize the need for Layer 2 or HARQ retransmissions.

Downlink transmissions to the mobile device are synchronized (step S170). Synchronized transmissions on the downlink without retransmission results in the mobile device 12 combining the received analog signal to maximize gain. Failed RLP packets are not retransmitted. Instead, it is left to conservative choice of modulation to minimize errors. This is consistent with real time traffic support where retransmissions at low Carrier-to-interference Ratios ("CIRs") may not be possible due to the tight delay requirements. Optionally, retransmission of packets may be allowed from the serving BTS 14 (i.e., the strongest BTS) using non-soft handoff slots.

The base station scheduler optimizes the use of resources by multiplexing other best effort non-soft handoff user packets into unused explicit soft handoff resource assignments. The BTS 14 sends a request to MSF 24 to increase its soft handoff resource assignment if the BTS's 14 buffers are filling up due to dynamic traffic conditions. With these elements, download soft handoff in a distributed Layer 2 architecture can be implemented in accordance with the present invention.

Of note, as another algorithm for the MSF to reserve resources for downlink SHO, the MSF can reserve resources to match the worst case AMC level, assuming that the weakest signal level is expected to continue for a reasonable period of time. All active set BTSs 14 then segment the IP packet based on the chosen dynamic AMC level selected by mobile device 12.

Figure 16:
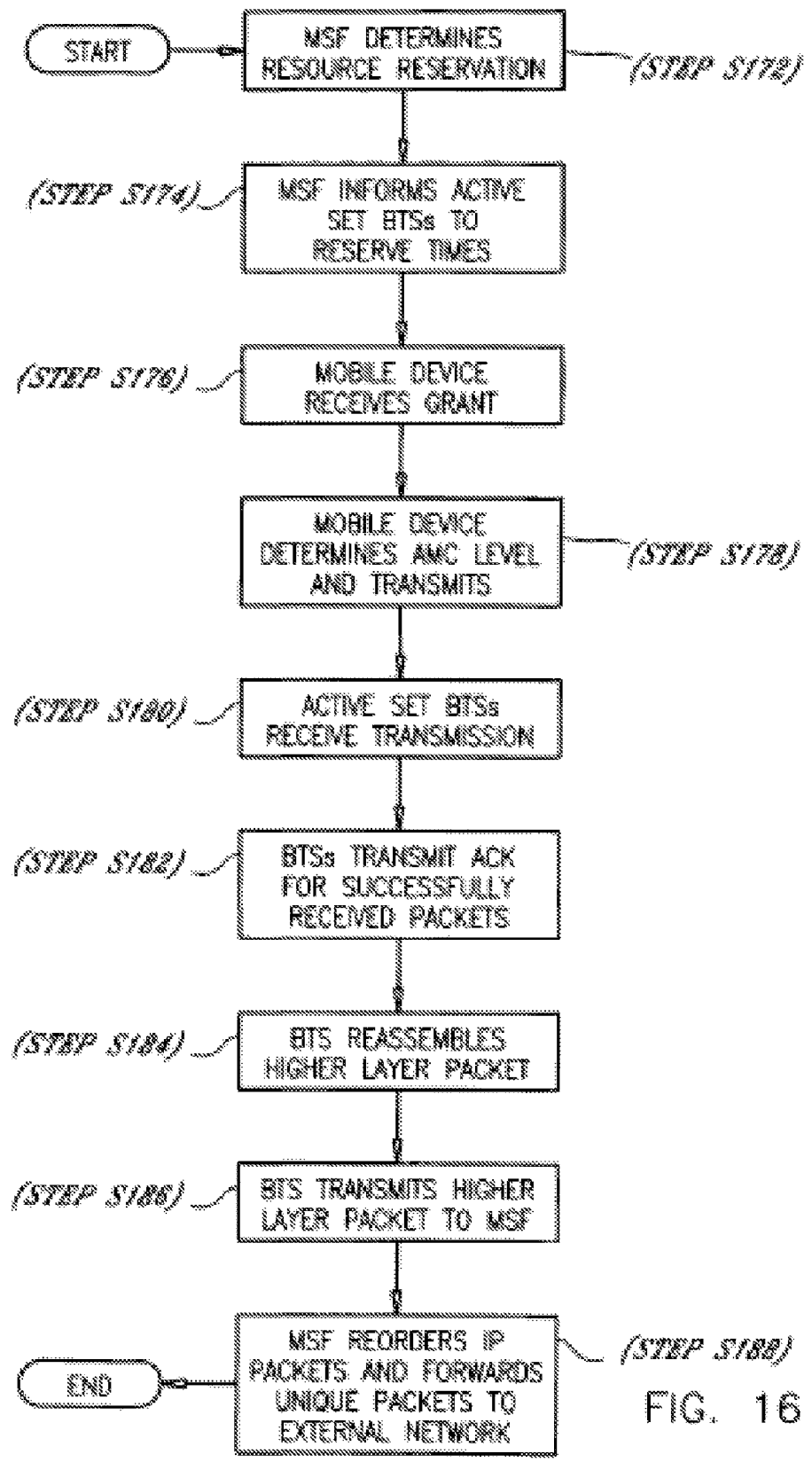
FIG. 16 is a flow chart of an uplink soft handoff method of the present invention.

An uplink soft handoff method of the present invention is now described with reference to FIGS. 1 and 16. A similar process as for downlink soft handoff described above (FIG. 15) can be followed for uplink soft handoff for active set identification. As described above, soft handoff resource reservations can also done by the MSF/RNC and provided to the BTSs 14. For bursty traffic, the reservations for soft handoff may be implemented to support the highest service rate required for the given service and some fixed AMC level. The resources may be reused on the basis of the mobile device indicating the amount of buffer loading and the choice of the AMC level so that the BTS 14 scheduler can reallocate the resource for transmissions from other non-soft handoff users. However, this information should be provided during some time period prior to its allocated schedule so that the BTS 14 can grant the balance of the resources to other users.

Initially, MSF 24 determines resource reservation, such as scheduling times, for the soft handoff mobile device 12 in the active set BTSs 14 (step S172) and informs all of these BTSs 14 to reserve the times for soft handoff reception (step S174). Note that unlike in CDMA where explicit reservation is not required, explicit reservation is generally required for uplink soft handoff in all active set BTSs 14 with OFDMA/MIMO. This is because uplink transmissions in OFDMA/MIMO systems are not separable by codes. Mobile device 12 receives a grant via the serving BTS 14 (step S176). The mobile device determines the AMC level and transmits (step S178).

All active set BTSs 14 receive RLP packets (step S180). The omission of HARQ or Layer 2 retransmissions assumes diversity gain is large. Alternatively, if it is feasible, retransmission may be allowed on a single link using a time slot grant from one of the active sets outside soft handoff reserved time slots. Each BTS 14 sends an ACK for successfully received packets (step S182) and each BTS 14 retains all successfully acknowledged packets at its end, and reassembles a higher layer, e.g., IP, packet (step S184). The BTSs 14 transmit correctly received higher layer, e.g., IP, packets to MSF 24 (step S186). MSF 24 reorders correct IP packets in sequential order and forwards the reordered IP packets to the external network after discarding duplicate IP packets (step S188). Of course, mobile station 12 retransmits a higher layer protocol packet if it determines that a higher layer packet was received a BTS 14 with an error.

The concept of flat networks where most of the Layer 2 processing is done at the BTS 14 is becoming increasing popular with network architectures such as the Flarion architecture as well as those of emerging standards under IEEE 802.16e. The present invention advantageously provides a method and system to address macro-diversity for these architectures. In accordance with the present invention, the role of the RNC to coordinate simultaneous scheduling is advantageously not required because mobile device 12 can facilitate the synchronous transmission from different BTSs 14. The present invention enables the support of SHO in systems which do not have a centralized control entity such as an RNC 16 to co-ordinate the simultaneous transmission of data from multiple base stations. By leveraging mobile device 12 to perform this SHO function, the dependency of requiring centralized network control is removed and creates ease of application for the SHO feature. The only additional resources required are increased air interface signaling and some additional software in the mobile device.

The present invention can be realized in hardware, software, or a combination of hardware and software. An implementation of the method and system of the present invention can be realized in a centralized fashion by having one computer system support the mobile devices, or in a distributed fashion where different elements used to support the mobile devices are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of receiving data from one or more station transceiver systems, comprising:
   at a mobile device:
   communicating with a first station transceiver system;
   receiving pilots transmitted by a first set of station transceiver systems, wherein the first set of station transceiver systems comprises a measurement set of two or more station transceiver systems including the first station transceiver system, and wherein a second set of station transceiver systems comprises an active set, wherein the active set comprises two or more station transceiver systems including the first station transceiver system, and is a proper subset of the measurement set;
   measuring radio link conditions based on the received pilots from the first set of station transceiver systems;

determining at least a first indication associated with a modulation and coding scheme based on the radio link conditions;

determining at least a second indication associated with an antenna processing option based on the radio link conditions, wherein one or more of the first and second indications are determined based on radio link conditions from at least a pilot transmitted by a second station transceiver system, wherein the second station transceiver system is different from the first station transceiver system;

reporting at least the first and second indication;

receiving a plurality of data transmissions from a plurality of third sets of station transceiver systems, wherein each data transmission of the plurality of data transmissions is received from a respective third set of station transceiver systems of the plurality of third sets of station transceiver systems, wherein each of the third sets is a subset of the station transceiver systems of the second set and comprises at least one station transceiver system of the second set, wherein the mobile device is configured to receive data transmissions of the plurality of data transmissions from respective different ones of the third sets of station transceiver systems contemporaneously, wherein a control channel signal related to each data transmission provides an indication related to at least a member of the third set.

2. The method of claim 1, wherein the indication related to at a member of the third set indicates the data transmission is associated with one station transceiver system.

3. The method of claim 1, wherein the indication related to at a member of the third set indicates a transmission from multiple station transceiver system.

4. The method of claim 1, wherein the plurality of data transmissions have been multi-cast to the at least the third set of transceiver systems as higher layer packets.

5. The method of claim 4, wherein the higher layer packets are internet protocol packets.

6. The method of claim 1, wherein the plurality of data transmissions have been multi-cast to the at least the third set of transceiver systems as MAC packets.

7. The method of claim 1, wherein determining the at least a first indication associated with a modulation and coding scheme further comprises determining the at least a first indication based on a combination of carrier to interference ratios of the received pilots.

8. The method of claim 1, further comprising the mobile device managing adding and dropping station transceiver systems to the second set of station transceiver systems.

9. The method of claim 1, further comprising a network entity managing adding and dropping station transceiver systems to the second set of station transceiver systems.

10. The method of claim 1, wherein receiving the plurality of data transmissions is based on a resources request transmitted by the mobile device.

11. A broadband cellular communication system, comprising:

a first set of station transceiver systems configured to transmit pilots to at least a first mobile station, wherein the first set of station transceiver systems comprises a measurement set of two or more station transceiver systems including a first station transceiver system; and a second set of station transceiver systems, wherein the second set comprises an active set, wherein the active set comprises two or more station transceiver systems including the first station transceiver system, and is a proper subset of the measurement set;

wherein one or more station transceiver systems of the second set are configured to:

receive one or more indications from at least the first mobile station, wherein a first indication is associated with a modulation and coding scheme based on the radio link conditions, wherein a second indication is associated with an antenna processing option based on the radio link conditions, wherein one or more first and second indications are determined based on radio link conditions from at least a pilot transmitted by a second station transceiver system of the first set of station transceiver systems, wherein the second station transceiver system is different from the first station transceiver system;

transmit a control channel signal related to a data transmission providing an indication related to at least a member of a third set of station transceiver systems of a plurality of third sets of station transceiver systems, wherein each of the third sets is subset of the station transceiver systems of the second set, and comprises at least one station transceiver system of the second set; and wherein each of the third sets of station transceiver systems is configured to:

transmit the data transmission to the mobile station based on the control channel indication, wherein the mobile station is configured to receive a plurality of data transmissions from respective different ones of the third sets of station transceiver systems contemporaneously.

12. The system of claim 11, wherein the indication related to at a member of the third set indicates the data transmission associated with one station transceiver system.

13. The system of claim 11, wherein the indication related to at a member of the third set indicates a transmission from multiple station transceiver system.

14. The system of claim 11, wherein the data transmission has been multi-cast to the at least the third set of transceiver systems as higher layer packets.

15. The system of claim 14, wherein the higher layer packets are IP packets.

16. The system of claim 11, wherein the data transmission has been multi-cast to the at least the third set of transceiver systems as MAC packets.

17. The system of claim 11, wherein the first indication is associated with a modulation and coding scheme based on a combination of carrier to interference ratios of the received pilots.

18. The system of claim 11, wherein the second set of station transceiver systems is managed by the first mobile station.

19. The system of claim 11, wherein a network entity is configured to manage adding and dropping station transceiver systems to the second set of station transceiver systems.

20. The system of claim 11, wherein the third set of transceiver systems is further configured to transit the data transmission based on a received resources request, wherein the resources request was transmitted by the first mobile station.

* * * * *